United States Patent
Hirose

(10) Patent No.: US 11,227,238 B2
(45) Date of Patent: Jan. 18, 2022

(54) RIDE-SHARING MANAGEMENT METHOD, RIDE-SHARING MANAGEMENT DEVICE, AND VEHICLE

(71) Applicants: Nissan Motor Co., Ltd., Kanagawa (JP); RENAULT S.A.S., Boulogne-Billancourt (FR)

(72) Inventor: Satoru Hirose, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 16/482,212

(22) PCT Filed: Feb. 2, 2017

(86) PCT No.: PCT/JP2017/003723
§ 371 (c)(1),
(2) Date: Jul. 30, 2019

(87) PCT Pub. No.: WO2018/142528
PCT Pub. Date: Aug. 9, 2018

(65) Prior Publication Data
US 2020/0226497 A1    Jul. 16, 2020

(51) Int. Cl.
*G06Q 10/02* (2012.01)
*E05F 15/70* (2015.01)
(Continued)

(52) U.S. Cl.
CPC ............ *G06Q 10/02* (2013.01); *E05F 15/70* (2015.01); *G06Q 10/04* (2013.01);
(Continued)

(58) Field of Classification Search
CPC ........ G06Q 10/02; G06Q 50/32; G08B 5/221; G06F 17/00
(Continued)

(56) References Cited

U.S. PATENT DOCUMENTS 10,643,439 B2 * 5/2020 Mangal et al. ........ G06Q 10/02
2006/0271261 A1   11/2006 Flores et al.
(Continued)

FOREIGN PATENT DOCUMENTS

CN    103489309 A     1/2014
JP    2000-234462 A   8/2000
(Continued)

OTHER PUBLICATIONS

D'Onfro, Jillian, "Facebook Has a Clever Idea to Turn Itself Into a Ride-Sharing Platform", Jan. 28, 2016, yahoo.com, 8 pgs. (Year: 2016).*

(Continued)

*Primary Examiner* — Shannon S Campbell
*Assistant Examiner* — Freda A Nelson
(74) *Attorney, Agent, or Firm* — Osha Bergman Watanabe & Burton LLP

(57) ABSTRACT

A ride-sharing management method for managing ride-sharing of a vehicle by a plurality of users using a control device, where the ride-sharing management method includes calculating a deboarding order of the users on a basis of boarding and deboarding locations of the users on a travel route of the vehicle for the users to share a ride, calculating an entrance to the vehicle on a basis of the deboarding order of the users, and setting seating positions of the users on a basis of the deboarding order and the entrance.

17 Claims, 15 Drawing Sheets

(51) Int. Cl.
  *G06Q 10/04* (2012.01)
  *G06Q 10/06* (2012.01)
  *G06Q 50/30* (2012.01)
  *G01C 21/34* (2006.01)
  *H04W 88/02* (2009.01)

(52) U.S. Cl.
  CPC ....... *G06Q 10/06312* (2013.01); *G06Q 50/30* (2013.01); *E05Y 2400/45* (2013.01); *E05Y 2900/531* (2013.01); *G01C 21/3438* (2013.01); *G06Q 2240/00* (2013.01); *H04W 88/02* (2013.01)

(58) Field of Classification Search
  USPC .................................. 705/5; 707/758; 701/2
  See application file for complete search history.

(56) References Cited

U.S. PATENT DOCUMENTS

| | | |
|---|---|---|
| 2007/0078691 A1 | 4/2007 | Wakabayashi |
| 2011/0082714 A1 | 4/2011 | Gaikwad |
| 2013/0054139 A1 | 2/2013 | Bodin et al. |
| 2013/0158861 A1 | 6/2013 | Lerenc |
| 2013/0238167 A1* | 9/2013 | Stanfield .............. B60Q 1/2696 701/2 |
| 2014/0197730 A1 | 7/2014 | Spence et al. |
| 2016/0098650 A1 | 4/2016 | Ratti et al. |
| 2017/0285642 A1* | 10/2017 | Rander |
| 2018/0039917 A1* | 2/2018 | Buttolo ........... B60W 60/00253 |
| 2019/0337447 A1 | 11/2019 | Dingman et al. |
| 2019/0347580 A1* | 11/2019 | Jiwani et al. ......... G06Q 10/02 |

FOREIGN PATENT DOCUMENTS

| | | | |
|---|---|---|---|
| JP | 2003-044702 A | | 2/2003 |
| JP | 2003-308596 A | | 10/2003 |
| JP | 2004-062490 A | | 2/2004 |
| JP | 2005-077243 A | | 3/2005 |
| JP | 2005-085217 A | | 3/2005 |
| JP | 2006018570 A | * | 1/2006 |
| JP | 2007-026328 A | | 2/2007 |
| JP | 2015-191264 A | | 11/2015 |
| KR | 20160049141 A | | 5/2016 |
| TW | 201425096 A | | 7/2014 |
| WO | 2015/061942 A1 | | 5/2015 |
| WO | 2015/123895 A1 | | 8/2015 |
| WO | WO-2018140000 A1 | * | 8/2018 ............. B60N 2/002 |

OTHER PUBLICATIONS

International Search Report issued in Application No. PCT/JP2017/003723, dated Mar. 14, 2017 (5 pages).
Written Opinion issued in International Application No. PCT/JP2017/003723, dated Mar. 14, 2017 (4 pages).
International Preliminary Report on Patentability issued in Application No. PCT/JP2017/003723, dated Aug. 8, 2019 (14 pages).
Office Action issued in the counterpart European Patent Application No. 17895261.0, dated Aug. 31, 2020 (8 pages).
Https://zhidao.baidu.com/question/872206691178791132.html, Nov. 30, 2013, Anonymous, Why do people who take the bus prefer not to sit by the window?, p. 1 paragraph 3 (3 pages).

* cited by examiner

RIDE-SHARING MANAGEMENT METHOD, RIDE-SHARING MANAGEMENT DEVICE, AND VEHICLE

TECHNICAL FIELD

One or more embodiments of present invention relate to a ride-sharing (carpool) management method, a ride-sharing management device, and a vehicle.

BACKGROUND

A ride-sharing mediation system is known which is configured to, when ride-sharing of a taxicab is applied for from user terminals via a network, refer to a ride-sharing management database to determine whether desired ride-sharing conditions of users match each other and, when the desired ride-sharing conditions of the users match each other, notify the user terminals that the ride-sharing is established (Patent Document 1, for example).

PRIOR ART DOCUMENT

Patent Document

[Patent Document 1] JP2003-44702A

SUMMARY

In the above ride-sharing mediation system, ride-sharing by the users is mediated without specifying which seats of the vehicle the users are to sit on. Accordingly, when one of the users gets off the vehicle on the way along the travel route of the vehicle, another user who remains on board may have to temporarily get off the vehicle for the user getting off the vehicle and the user may not be able to smoothly get off the vehicle. The same applies to similar cases.

One or more embodiments of the present invention may achieve smooth deboarding of users sharing a ride on a vehicle.

One or more embodiments of the present invention sets seating positions of a plurality of users on the basis of boarding and deboarding locations of the users on a travel route of a vehicle for the users to share a ride.

According to one or more embodiments of the present invention, the users sharing a ride on the vehicle can be allowed to sit at the seating positions in accordance with the boarding and deboarding locations of the users on the travel route of the vehicle and it is therefore possible to achieve smooth deboarding of the users sharing a ride on the vehicle.

DETAILED DESCRIPTION

Figure 1:
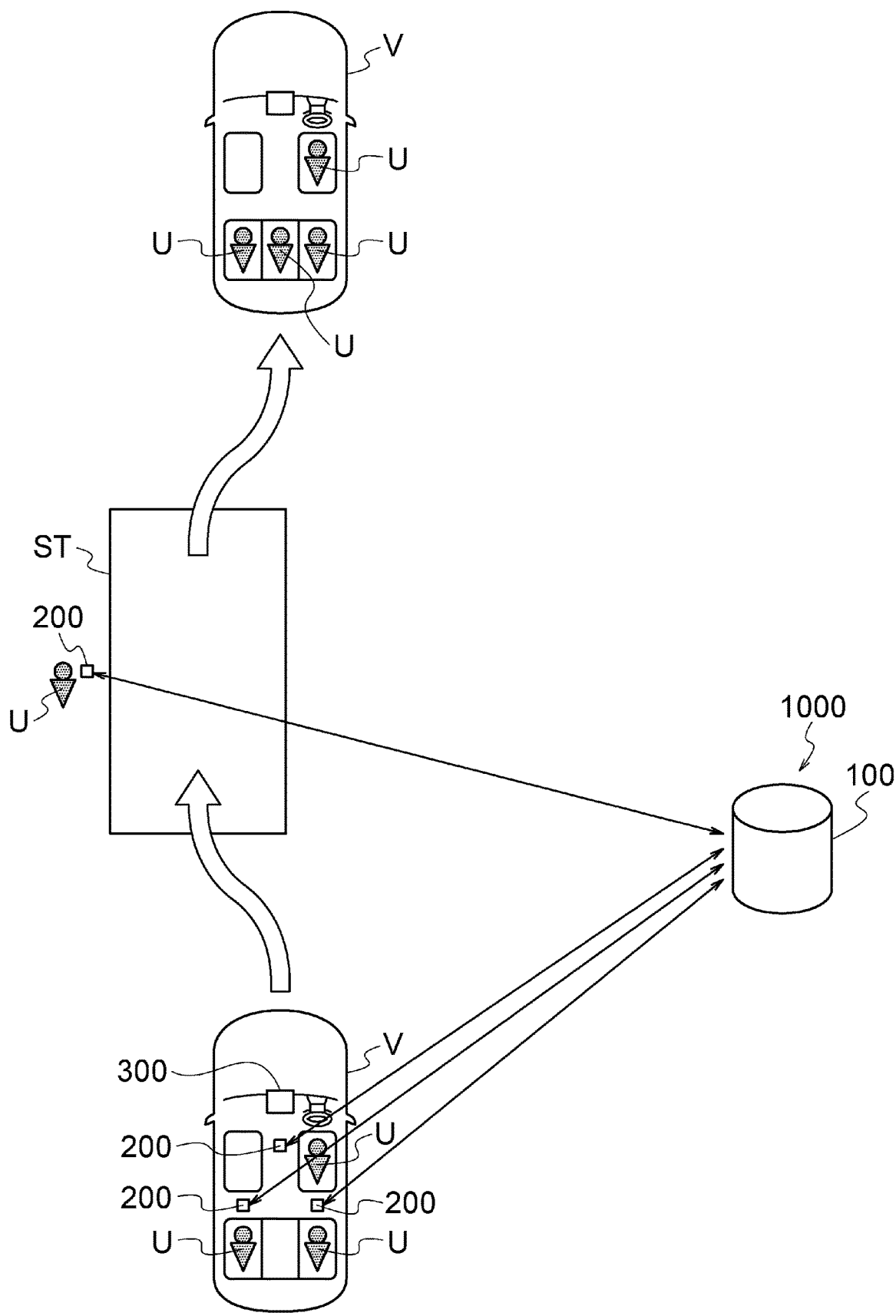
FIG. 1 is a diagram illustrating the outline of a service using a ride-sharing management system according to one or more embodiments of the present invention.

Hereinafter, one or more embodiments of the present invention will be described with reference to the drawings. FIG. 1 is a diagram illustrating the outline of a service using a ride-sharing management system 1000 according to one or more embodiments of the present invention.

The service using the ride-sharing management system 1000 according to one or more embodiments of the present invention includes receiving reservation request information including whether or not to accept ride-sharing from a user terminal 200 of a user U and transmitting reservation settlement information, such as the locations of a station ST for boarding and a station ST for deboarding, to the user terminal 200. In this service, for a plurality of users U who accept ride-sharing and meet a given condition, they are made to share a ride on a vehicle V for transportation, and for a user U who does not accept ride-sharing or who accepts ride-sharing but does not meet the given condition, he/she is made to board a vehicle V alone for transportation. In particular, in this service, respective seating positions of users U in the vehicle V are set in accordance with the boarding and deboarding locations of the users U on a travel route of the vehicle V thereby to achieve smooth deboarding of the users U at the stations ST.

The vehicle V may be a shared vehicle (vehicle for car sharing), a vehicle for hire (such as a taxicab), or the like. The vehicle V may be a vehicle traveling by manual driving or may also be a vehicle traveling by automated/autonomous driving. In the case of a vehicle V traveling by manual driving, the driver of the vehicle V may be a driver who belongs to a business side providing the service or may also be a user U provided with the service. When the user U can be the driver of the vehicle V, the reservation information may be configured to include presence or absence of the user's desire to drive. The positions and the number of stations ST may be preliminarily set or may also be set in accordance with the reservation situation from the users U. For example, the station ST for boarding is preliminarily set while the station ST for deboarding is set in accordance with the reservation situation. Thus, the station ST for boarding and the station ST for deboarding may each be appropriately set. The travel route of the vehicle V may be preliminarily set or may also be set in accordance with the reservation situation from the users U.

Figure 2:
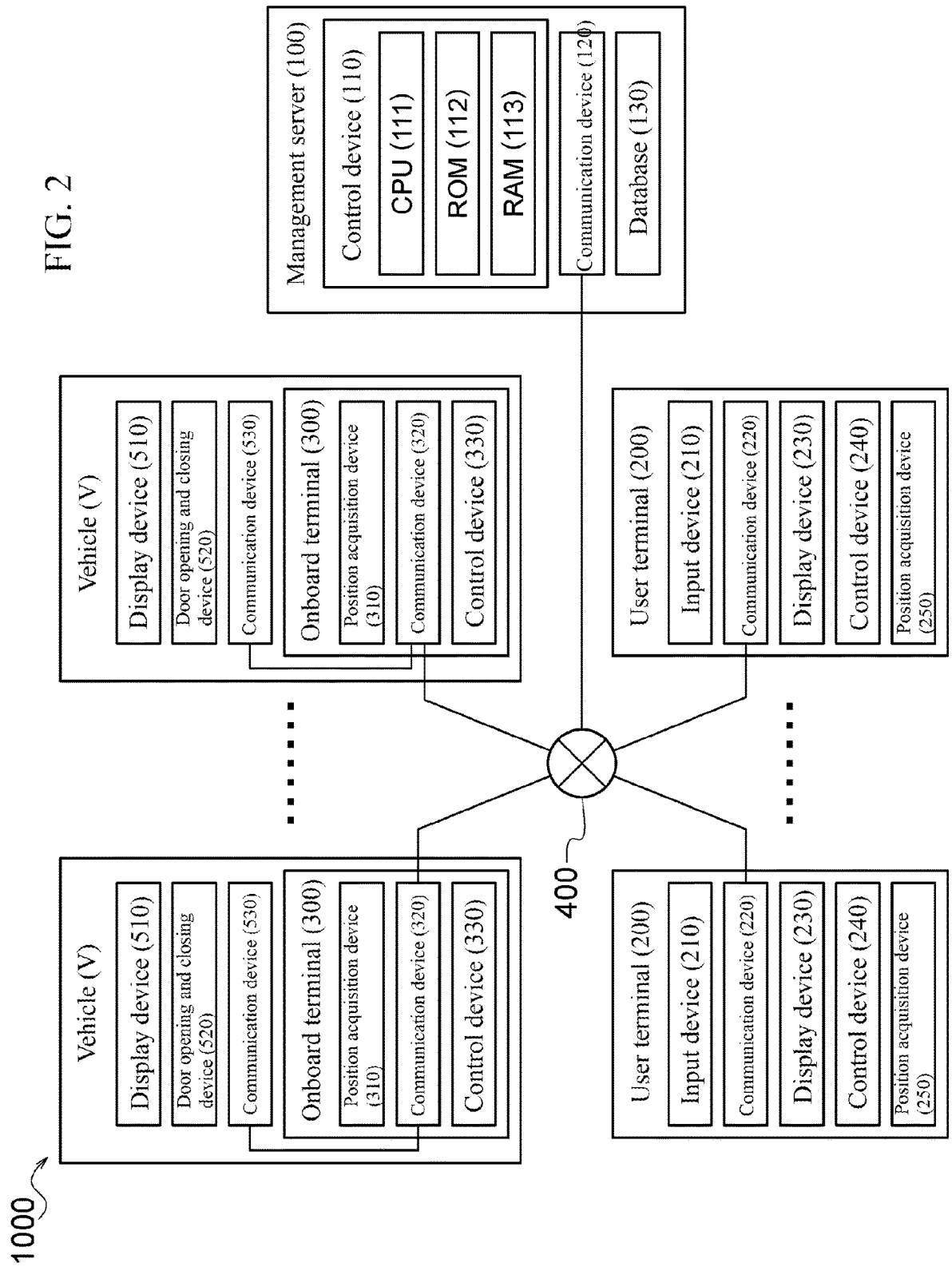
FIG. 2 is a block diagram illustrating the schematic configuration of the ride-sharing management system according to one or more embodiments of the present invention.

FIG. 2 is a block diagram illustrating the schematic configuration of the ride-sharing management system 1000 according to one or more embodiments of the present invention. As illustrated in the figure, the ride-sharing management system 1000 according to one or more embodiments of the present invention includes a management server 100, user terminals 200, onboard terminals 300, and vehicles V. The management server 100, the user terminals 200, and the onboard terminals 300 each include a communication device (120, 220, 320) and are connected to one another via a network 400.

Each of the vehicles V includes a display device 510 for notifying the user U of the seating position and the entrance, a door opening and closing device 520 that automatically opens and closes the door, and a communication device 530 that communicates with the onboard terminal 300. Examples of the display device 510 include a monitor that can be viewed from outside the vehicle and a lighting lamp or the like that is provided on a door or a door lever. The door opening and closing device 520 may be a door lock opening and closing device and, in this case, the user may perform the opening and closing of the door itself. Thus, the door opening and closing device 520 is not limited to an opening and closing device for the door. In the vehicles V according to one or more embodiments of the present invention, the driver seat is provided as the right-side front seat, the front passenger seat is provided as the left-side front seat, and one or more rear seats are provided on which three users U can sit side by side. In the vehicles V according to one or more embodiments of the present invention, doorways (entrances/exits) are provided on the right and left sides of the front seats and the right and left sides of the rear seat or seats.

Each of the user terminals 200 is a computer comprising a read only memory (ROM) that stores a reservation program, a central processing unit (CPU) as an operation circuit that executes the program stored in the ROM thereby to execute each function, and a random access memory (RAM) that serves as an accessible storage device. Examples of the user terminals 200 according to one or more embodiments of the present invention include smartphones, personal digital assistants (PDAs), and other mobile terminals.

Each of the user terminals 200 includes an input device 210 for the user U to input the reservation request information, a communication device 220 that communicates with an external device such as the management server 100, a display device 230 that notifies the user U of the reservation settlement information such as the position of a station ST, the boarding time, and the seating position, a control device 240 that executes processes such as reception of the reservation request information and notification of the reservation settlement information, and a position acquisition device 250 such as a receiver of the global positioning system (GPS). Examples of the input device 210 include a touch panel, an operation key, or the like that allows for input by the operation of the user U and a microphone or the like that allows for input by sound or voice of the user U. The reservation request information received by the input device 210 includes at least the user ID, the departure place, the destination, and whether or not to accept ride-sharing. Other examples of the reservation request information include the presence or absence of a desire to drive, the presence or absence of a baggage, the attribute of the user U (such as age, sex, and the presence or absence of a physical disability), and a request from the user U (such as a desire for a seating position at which sunshine can be avoided and a desire for a seating position at which the room temperature is appropriately set).

Examples of the display device 230 include a display such as a liquid crystal display or an organic EL display and a touch panel display. When a touch panel display is used, it can also serve as the input device 210. The reservation settlement information notified by the display device 230 includes the location of the station ST for boarding, the scheduled boarding time, the presence or absence of ride-sharing, the seating position in the vehicle V, the entrance when boarding, the location of the station ST for deboarding, and the scheduled deboarding time. Other examples of the reservation settlement information include the presence or absence of driving.

The control device 240 transmits the reservation request information input from the input device 210 to the management server 100 via the communication device 220 and controls the display device 230 to display the reservation settlement information received from the management server 100 via the communication device 220. In addition, the control device 240 transmits the information on the current position of the user terminal 200 acquired by the position acquisition device 250 to the management server 100 via the communication device 220.

Each of the onboard terminals 300 includes a position acquisition device 310 such as a GPS receiver, a communication device 320 that communicates with an external device such as the management server 100, and a control device 330. The control device 330 transmits the information on the current position acquired by the position acquisition device 310 to the management server 100 via the communication device 320. In addition, the control device 330 receives control commands for controlling the display device 510 and the door opening and closing device 520 from the management server 100 via the communication devices 120 and 320 and controls the display device 510 and door opening and closing device 520 of the vehicle V. For example, the control device 330 controls a monitor as the display device 510 to display the seating position and entrance for the user U and/or controls a lighting lamp as the display device 510, which is provided on the door lever of a door to be opened and closed, to light up. In addition, the control device 330 operates the door opening and closing device 520 so that the door provided at the entrance or exit for the user U is opened and closed.

The management server 100 includes a control device 110 that executes a control process for executing reservation management and ride-sharing management, a communication device 120 that can communicate with the user terminals 200 and the onboard terminals 300, and a database 130 that stores necessary information items such as the reservation request information, user information, users' use result information, and map information. The control device 110 includes a ROM 112 that stores programs for executing control processes for the reservation management and the ride-sharing management, a CPU 111 as an operation circuit that executes the programs stored in the ROM 112 thereby to serve as a reservation management device and a ride-sharing management device, and a RAM 113 that serves as an accessible storage device.

The control device 110 executes the programs stored in the ROM 112 thereby to achieve a reservation management function and a ride-sharing management function. These functions achieved by the control device 110 will be described below. The control device 110 is a computer that achieves the above functions by cooperation of software for achieving the functions and the above-described hardware.

The reservation management function of the control device 110 includes a reservation information acquisition/record/notification function, a boarding/deboarding location calculation function, a vehicle management function, and a user management function. The reservation information acquisition/record/notification function serves to acquire the reservation request information from the user terminals 200. Specifically, the reservation information acquisition/record/notification function serves to acquire information items such as the user ID, the departure place, the destination, whether or not to accept ride-sharing, and the presence or absence of a desire to drive.

The user management function serves to crosscheck the user ID acquired using the reservation information acquisition/record/notification function and the user ID recorded in the database 130 and acquire the personal information of the user U from the database 130. The user management function also serves to record the seating position and deboarding location of the user U on board as the use result information in the database 130. Users' desires for seating positions and the like may be preliminarily collected from the users and recorded in the database 130.

The boarding/deboarding location calculation function serves to calculate the user's boarding and deboarding locations on the travel route of the vehicle V on the basis of the information on the departure place and destination acquired using the reservation information acquisition/record/notification function. Specifically, the boarding/deboarding location calculation function serves to select the station ST closest to the departure place or destination desired by the user U from among stations ST which are preliminarily set, set the station ST closest to the departure place or destination desired by the user U, or perform similar selection or setting.

The vehicle management function serves to determine whether or not there is a vehicle V that can be available at the boarding station ST calculated using the boarding/deboarding location calculation function. When an available vehicle V is present, the reservation information acquisition/record/notification function serves to transmit reservation completion information to the user terminal 200 via the communication device 120. When no available vehicle V is present, the reservation information acquisition/record/notification function serves to transmit reservation failure information to the user terminal 200 via the communication device 120 to the effect that the reservation has not been established. Here, when ride-sharing is "acceptable" in the reservation request information, the vehicle management function serves to determine whether or not a vehicle V that allows for boarding by ride-sharing or boarding alone can be available, in accordance with the determination result as to whether the ride-sharing is possible or not. This determination result is made by the ride-sharing management function, which will be described later.

As described above, the reservation settlement information calculated or acquired using each function of the control device 110 is recorded in the database 130 and transmitted to the user terminal 200 and the onboard terminal 300 via the communication device 120 using the reservation information acquisition/record/notification function. The display device 230 of the user terminal 200 is controlled to display the reservation settlement information which includes the boarding and deboarding locations of the user U on the travel route of the vehicle V, the entrance (the position of the door for boarding), and the seating position.

The ride-sharing management function includes a ride-sharing possible/impossible determination function, a seating position calculation function, and a vehicle equipment control function. For a plurality of users for whom ride-sharing is "acceptable" in the reservation request information, the ride-sharing possible/impossible determination function serves to determine whether the ride-sharing is possible or not, in accordance with whether a given condition is met or not. Specifically, the ride-sharing possible/impossible determination function serves to determine whether or not at least a part of sections of the travel route of the vehicle V is the same, from the boarding and deboarding locations of the users U calculated using the boarding/deboarding location calculation function. Here, in one or more sections in which the travel route is the same, a plurality of users U will share a ride on the vehicle V.

The seating position calculation function serves to calculate the entrance (the position of the door for boarding), the exit (the position of the door for deboarding), and the seating position for each of the users U for whom a determination is made that the ride-sharing is "possible" using the ride-sharing possible/impossible determination function. Specifically, the seating position calculation function serves to determine, on the basis of the map information, the position of a space outside the vehicle (e.g. the right or left side space of the vehicle V) at which boarding or deboarding the vehicle V is possible at each station ST. Then, the seating position calculation function serves to calculate the deboarding order of the plurality of users U from the boarding and deboarding locations of the users U on the travel route of the vehicle V and calculate respective seating positions that meet the given conditions from the deboarding order, the entrances, and the exits. Details of a process of calculating the seating positions will be described later.

When the vehicle V makes a stop at a station ST, the vehicle equipment control function serves to transmit an opening/closing command for the door opening and closing device 520 to open and close a door of the vehicle V and a display command for the display device 510 to display the seating position and the entrance to the onboard terminal 300 via the communication device 120. Receiving the above display command via the communication device 320, the control device 330 of the onboard terminal 300 controls a monitor as the display device 510, for example, to display the seating position and entrance for the user U and/or controls a lighting lamp as the display device 510, which is provided on the door lever of a door to be opened and closed, to light up. In addition, receiving the above opening/closing command via the communication device 320, the control device 330 operates the door opening and closing device 520 so that the door provided at the entrance or exit for the user U is opened and closed.

FIG. 3 to FIG. 8 are diagrams for describing a seating position calculation process executed by the control device 110. These figures illustrate examples in which two users U have already sat on rear seats of a five-seater vehicle V and in this state a third user U boards the vehicle V and sits on a rear seat. In the following description, the user U having the first deboarding order will be referred to as a user U1, the user U having the second deboarding order will be referred to as a user U2, and the user U having the third deboarding order will referred to as a user U3.

Figure 3:
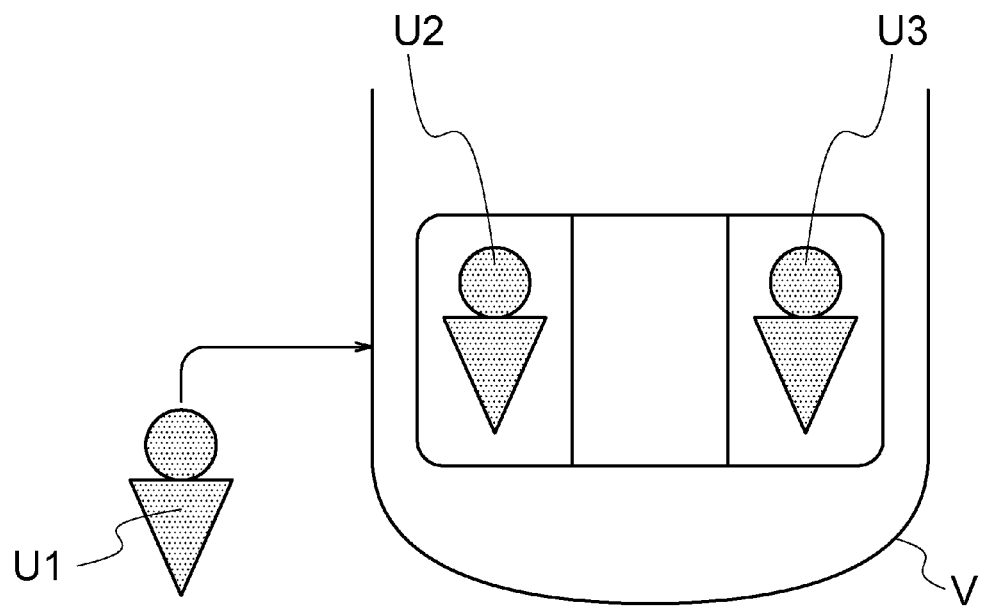
FIG. 3 is a diagram for describing a seating position calculation process executed by a control device of a management server according to one or more embodiments of the present invention.
Figure 3:
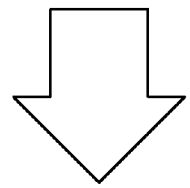
Figure 3:
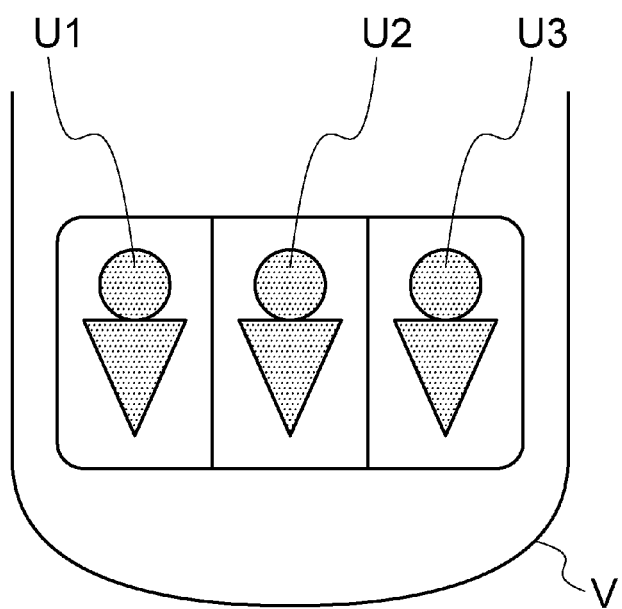

FIG. 3 illustrates an example in which the user U2 sits on the left-side rear seat, the user U3 sits on the right-side rear seat, and the user U1 boards the vehicle. In this example, if the user U1 boards from the entrance on the left side of the rear seats and sits on the seating position of the left-side rear seat after the user U2 sitting on the left-side rear seat moves to the seating position of the middle rear seat, then, at the next station, the user U1 can deboard the vehicle from the exit on the left side of the rear seats without requiring the users U2 and U3 to move from their seating positions. This allows the user U1 to smoothly deboard the vehicle. In such a situation, therefore, the seating position calculation function of the control device 110 serves to calculate the entrance and exit for the user U1 on the left side of the rear seats, calculate the seating position of the user U2 as the middle rear seat, and calculate the seating position of the user U3 as the right-side rear seat.

Figure 4:
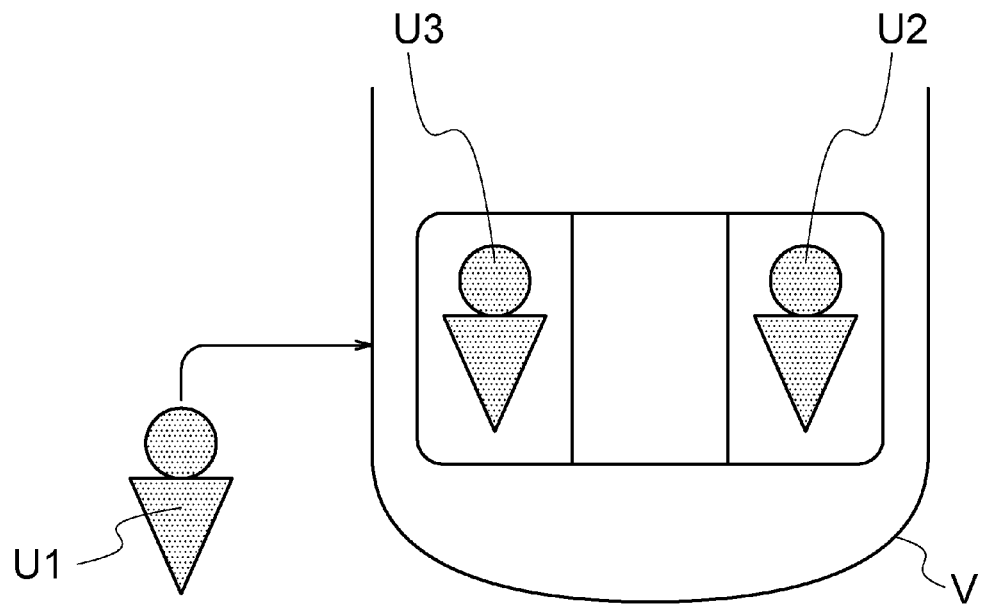
FIG. 4 is a diagram for describing the seating position calculation process executed by the control device of the management server according to one or more embodiments of the present invention.
Figure 4:
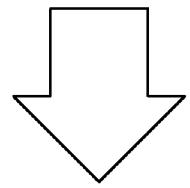
Figure 4:
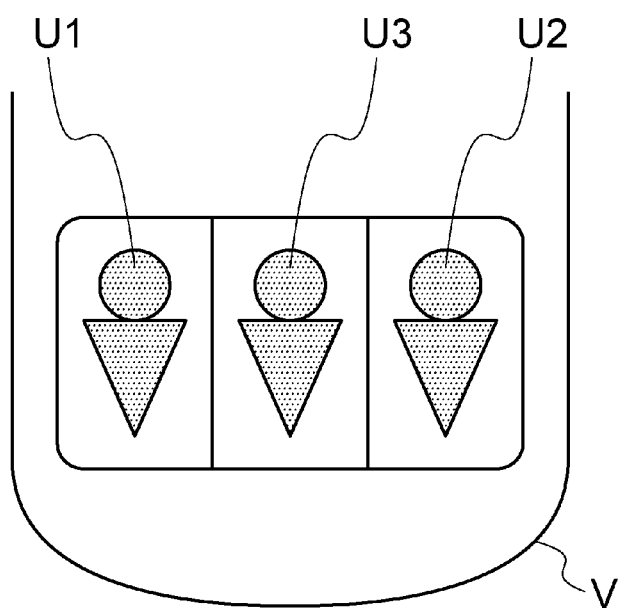

FIG. 4 illustrates an example in which the user U3 sits on the left-side rear seat, the user U2 sits on the right-side rear seat, and the user U1 boards the vehicle. In this example, if the user U1 boards from the entrance on the left side of the rear seats and sits on the seating position of the left-side rear seat after the user U3 sitting on the left-side rear seat moves to the seating position of the middle rear seat, then, at the next station, the user U1 can deboard the vehicle from the exit on the left side of the rear seats without requiring the users U2 and U3 to move from their seating positions. This allows the user U1 to smoothly deboard the vehicle. In such a situation, therefore, the seating position calculation function of the control device 110 serves to calculate the entrance and exit for the user U1 on the left side of the rear seats, calculate the seating position of the user U3 as the middle rear seat, and calculate the seating position of the user U2 as the right-side rear seat.

Figure 5:
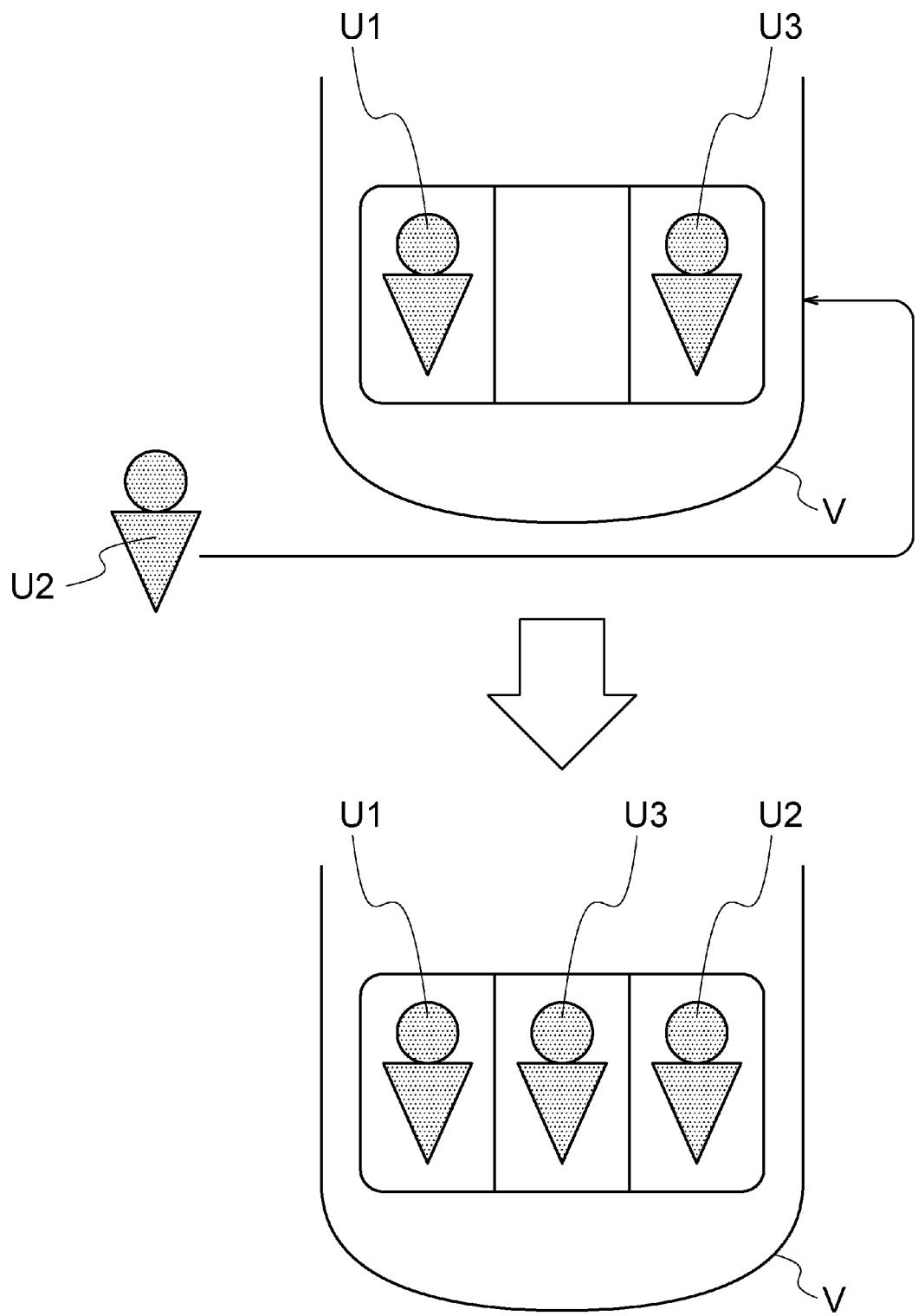
FIG. 5 is a diagram for describing the seating position calculation process executed by the control device of the management server according to one or more embodiments of the present invention.

FIG. 5 illustrates an example in which the user U1 sits on the left-side rear seat, the user U3 sits on the right-side rear seat, and the user U2 boards the vehicle. In this example, if the user U2 boards from the entrance on the right side of the rear seats and sits on the seating position of the right-side rear seat after the user U3 sitting on the right-side rear seat moves to the seating position of the middle rear seat, then, at the next station, the user U1 can deboard the vehicle from the exit on the left side of the rear seats without requiring the users U2 and U3 to move from their seating positions. This allows the user U1 to smoothly deboard the vehicle. In such a situation, therefore, the seating position calculation function of the control device 110 serves to calculate the entrance and exit for the user U2 on the right side of the rear seats, calculate the seating position of the user U3 as the middle rear seat, and calculate the seating position of the user U1 as the left-side rear seat.

Figure 6:
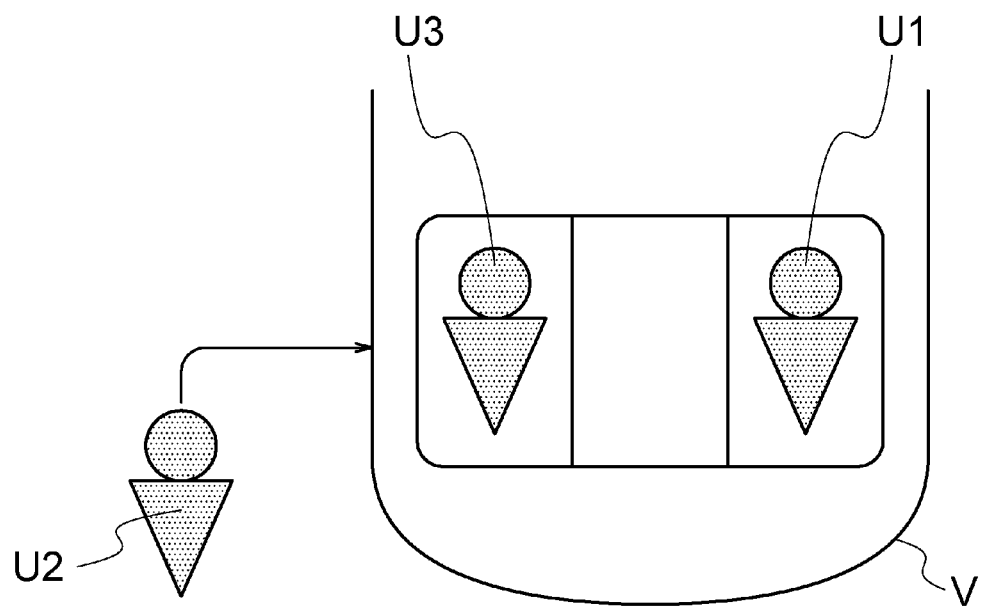
FIG. 6 is a diagram for describing the seating position calculation process executed by the control device of the management server according to one or more embodiments of the present invention.
Figure 6:
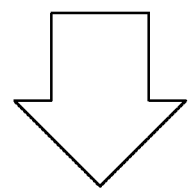
Figure 6:
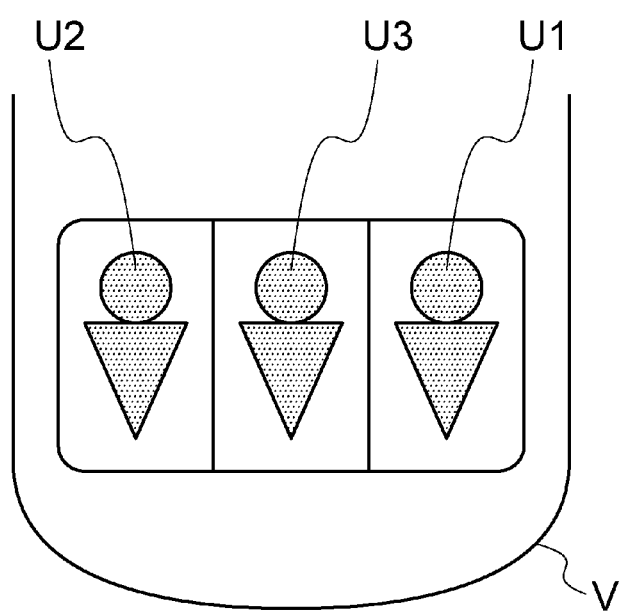

FIG. 6 illustrates an example in which the user U1 sits on the right-side rear seat, the user U3 sits on the left-side rear seat, and the user U2 boards the vehicle. In this example, if the user U2 boards from the entrance on the left side of the rear seats and sits on the seating position of the left-side rear seat after the user U3 sitting on the left-side rear seat moves to the seating position of the middle rear seat, then, at the next station, the user U1 can deboard the vehicle from the exit on the right side of the rear seats without requiring the users U2 and U3 to move from their seating positions. This allows the user U1 to smoothly deboard the vehicle. In such a situation, therefore, the seating position calculation function of the control device 110 serves to calculate the entrance and exit for the user U2 on the left side of the rear seats, calculate the seating position of the user U3 as the middle rear seat, and calculate the seating position of the user U1 as the right-side rear seat.

Figure 7:
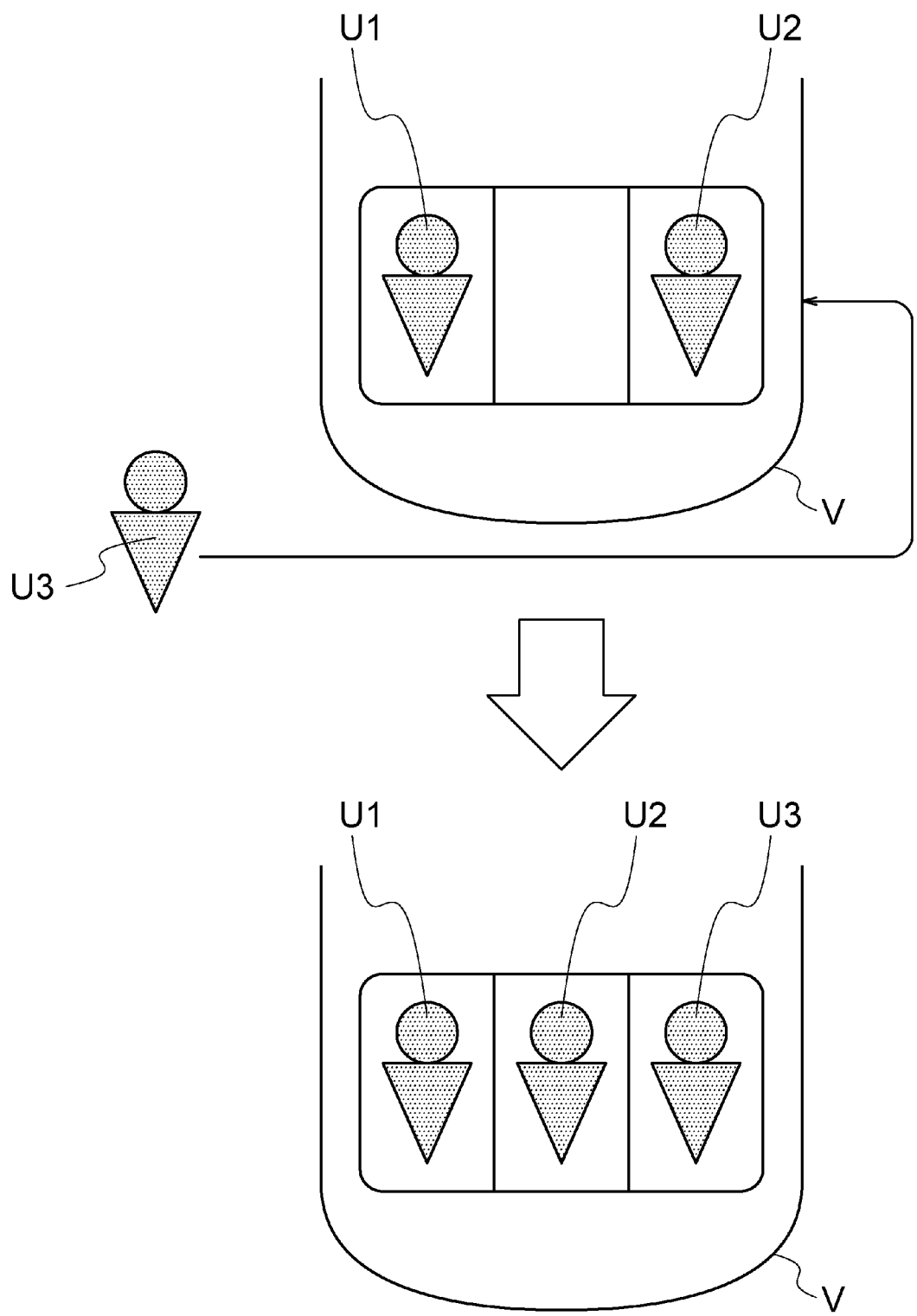
FIG. 7 is a diagram for describing the seating position calculation process executed by the control device of the management server according to one or more embodiments of the present invention.

FIG. 7 illustrates an example in which the user U1 sits on the left-side rear seat, the user U2 sits on the right-side rear seat, and the user U3 boards the vehicle. In this example, if the user U3 boards from the entrance on the right side of the rear seats and sits on the seating position of the right-side rear seat after the user U2 sitting on the right-side rear seat moves to the seating position of the middle rear seat, then, at the next station, the user U1 can deboard the vehicle from the exit on the left side of the rear seats without requiring the users U2 and U3 to move from their seating positions. This allows the user U1 to smoothly deboard the vehicle. In such a situation, therefore, the seating position calculation function of the control device 110 serves to calculate the entrance and exit for the user U3 on the right side of the rear seats, calculate the seating position of the user U2 as the middle rear seat, and calculate the seating position of the user U1 as the left-side rear seat.

Figure 8:
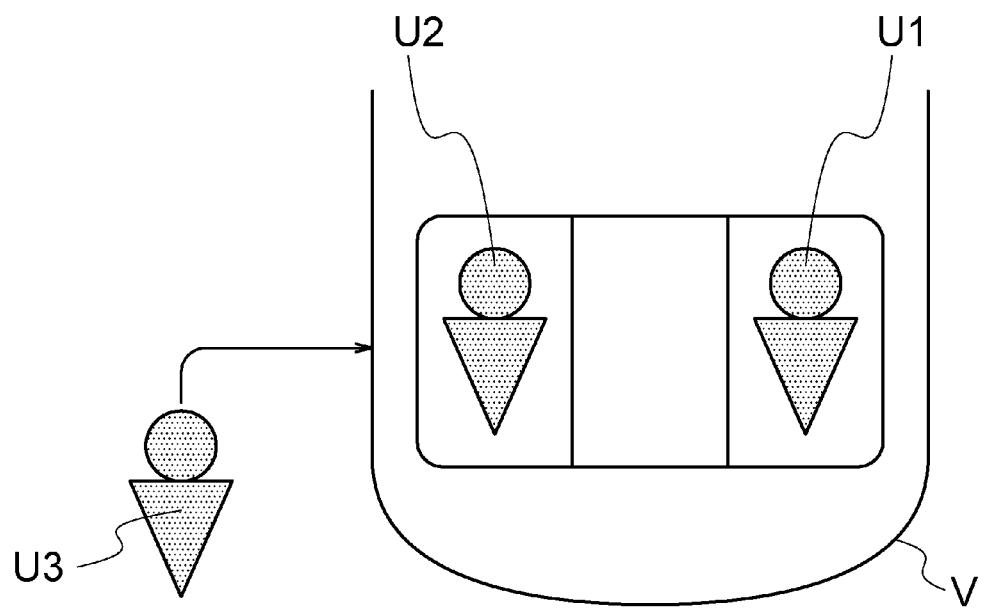
FIG. 8 is a diagram for describing the seating position calculation process executed by the control device of the management server.
Figure 8:
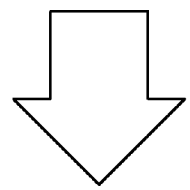
Figure 8:
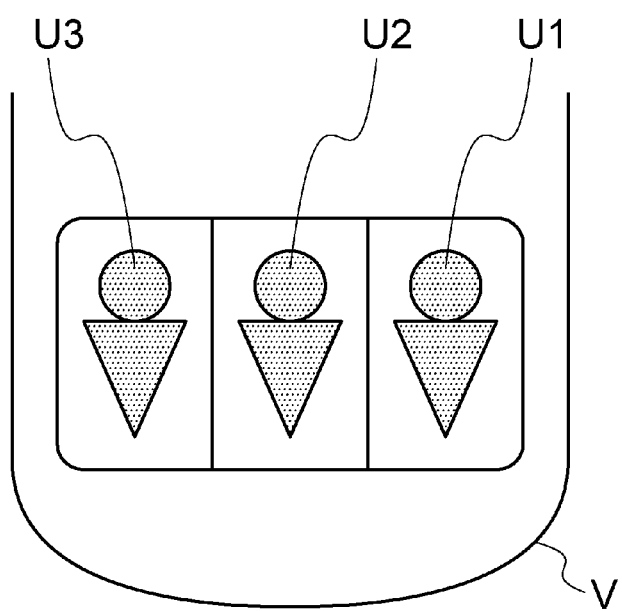

FIG. 8 illustrates an example in which the user U1 sits on the right-side rear seat, the user U2 sits on the left-side rear seat, and the user U3 boards the vehicle. In this example, if the user U3 boards from the entrance on the left side of the rear seats and sits on the seating position of the left-side rear seat after the user U2 sitting on the left-side rear seat moves to the seating position of the middle rear seat, then, at the next station, the user U1 can deboard the vehicle from the exit on the right side of the rear seats without requiring the users U2 and U3 to move from their seating positions. This allows the user U1 to smoothly deboard the vehicle. In such a situation, therefore, the seating position calculation function of the control device 110 serves to calculate the entrance and exit for the user U3 on the left side of the rear seats, calculate the seating position of the user U2 as the middle rear seat, and calculate the seating position of the user U1 as the right-side rear seat.

Embodiments of processes executed by the ride-sharing management system 1000 will be described below.

Figure 9:
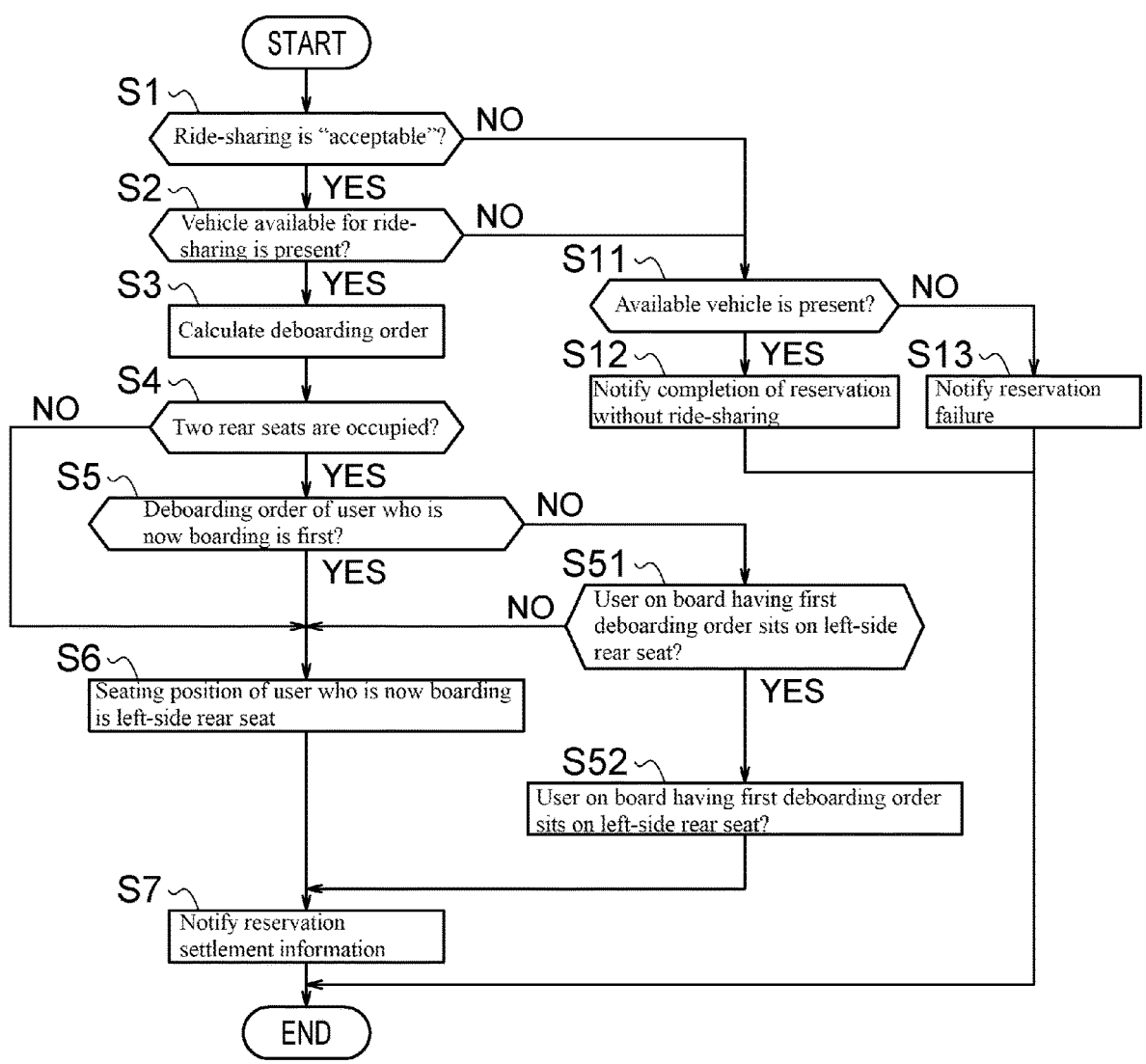
FIG. 9 is a flowchart illustrating one or more embodiments of the process executed by the ride-sharing management system.

FIG. 9 is a flowchart illustrating one or more embodiments of the process executed by the ride-sharing management system 1000. The process illustrated in this flowchart is started when the reservation request information is input from the input device 210 of the user terminal 200, and the process proceeds to step 1. In step 1, the ride-sharing possible/impossible determination function of the control device 110 serves to determine whether or not ride-sharing is "acceptable" in the reservation request information. An affirmative determination is followed by step 2 while a negative determination is followed by step 11.

In step 2, the boarding/deboarding location calculation function of the control device 110 serves to calculate the boarding and deboarding locations of the user U on the travel route of the vehicle V on the basis of the departure place and destination included in the reservation request information. Then, the vehicle management function serves to determine whether or not a vehicle V is present which can be used for ride-sharing and can respond to the boarding and deboarding locations calculated using the boarding/deboarding location calculation function. An affirmative determination is followed by step 3 while a negative determination is followed by step 11.

In step 11, the boarding/deboarding location calculation function of the control device 110 serves to calculate the boarding and deboarding locations of the user U on the travel route of the vehicle V on the basis of the departure place and destination included in the reservation request information. Then, the vehicle management function serves to determine whether or not a vehicle V is present which can respond to the boarding and deboarding locations calculated using the boarding/deboarding location calculation function. An affirmative determination is followed by step 12 while a negative determination is followed by step 13.

In step 12, the reservation information acquisition/record/notification function serves to transmit the reservation completion information to the user terminal 200 via the communication device 120 to the effect that the reservation of boarding under the condition of not sharing a ride has been completed. This allows the display device 230 of the user terminal 200 to display the notification that the reservation of boarding under the condition of not sharing a ride has been completed, and the process is concluded. Here, the reservation completion information includes at least the boarding and deboarding locations. On the other hand, in step 13, the reservation information acquisition/record/notification function serves to transmit the reservation failure information to the user terminal 200 via the communication device 120 to the effect that the reservation has not been established. This allows the display device 230 of the user terminal 200 to display the notification that the reservation has not been established, and the process is concluded.

In step 3, the seating position calculation function of the control device 110 serves to calculate the deboarding order of a plurality of users U from the boarding and deboarding locations of the users U on the travel route of the vehicle V. Then, in step 4, the seating position calculation function serves to determine whether or not two rear seats are occupied among the three rear seats of the vehicle V for the users U to share a ride. An affirmative determination is followed by step 5 while a negative determination is followed by step 6.

In step 5, the seating position calculation function serves to determine whether or not the deboarding order of the user U who is now boarding is first. An affirmative determination is followed by step 6 while a negative determination is followed by step 51. In step 51, the seating position calculation function serves to determine whether or not the user U having the first deboarding order out of the two users U, who have already sat on the rear seats, sits on the left-side rear seat. An affirmative determination is followed by step 52 while a negative determination is followed by step 6. In step 52, the seating position calculation function serves to calculate the seating position of the user U who is now boarding as the right-side rear seat. The process then proceeds to step 7. On the other hand, in step 6, the seating position calculation function serves to calculate the seating position of the user U who is now boarding as the left-side rear seat. The process then proceeds to step 7.

In step 7, the reservation information acquisition/record/notification function of the control device 110 serves to transmit the reservation settlement information including the seating position to the user terminal 200 via the communication device 120. This allows the display device 230 of the user terminal 200 to display the notification that the reservation has been completed, the seating position, etc., and the process is thus concluded.

As described above, in the process executed by the ride-sharing management system 1000 according to one or more embodiments, the seating positions of a plurality of users U are set on the basis of the boarding and deboarding locations of the users U on the travel route of the vehicle V for the users to share a ride. For example, as described above, when three users sit on the rear seats, the seating position of the user U having the first deboarding order is set at the left-side rear seat or the right-side rear seat. Through this setting, when the user U having the first deboarding order deboards the vehicle, the users U having the second deboarding order and the third deboarding order need not move and it is therefore possible to achieve smooth deboarding of the users U from the vehicle.

Moreover, in one or more embodiments, the display device 230 of the user terminal 200 notifies the user U of the set seating position. This allows the user U to perceive the seating position before boarding and therefore to smoothly board the vehicle.

Figure 10:
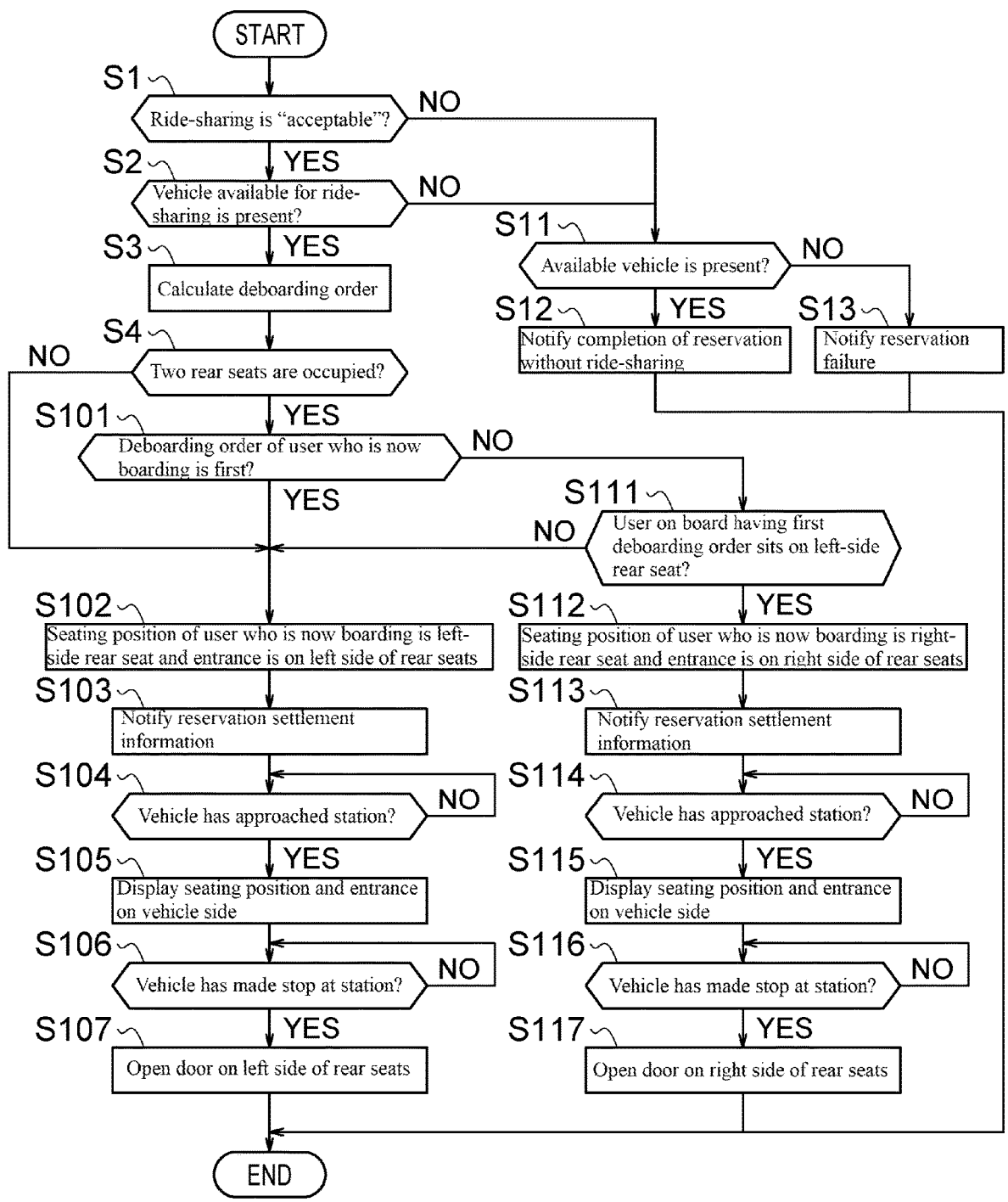
FIG. 10 is a flowchart illustrating one or more embodiments of the process executed by the ride-sharing management system.

FIG. 10 is a flowchart illustrating one or more embodiments of the process executed by the ride-sharing management system 1000. The process illustrated in this flowchart is started when the reservation request information is input from the input device 210 of the user terminal 200, and the process proceeds to step 1. Steps 1 to 4 and 11 to 13 are the same as those in one or more embodiments described above, so repetitive description will be omitted and the description given above will be borrowed herein.

When an affirmative determination is made in step 4, the process proceeds to step 101 while when a negative determination is made in step 4, the process proceeds to step 102. In step 101, the seating position calculation function of the control device 110 serves to determine whether or not the deboarding order of the user U who is now boarding is first. An affirmative determination is followed by step 102 while a negative determination is followed by step 111.

In step 102, the seating position calculation function serves to calculate the seating position of the user U who is now boarding as the left-side rear seat and calculate the entrance for the user U on the left side of the rear seats. Then, in step 103, the reservation information acquisition/record/notification function serves to transmit the reservation settlement information, which includes the boarding and deboarding locations, the seating position, and the entrance, to the user terminal 200 via the communication device 120. This allows the display device 230 of the user terminal 200 to display the notification of reservation completion, the notification of the boarding and deboarding locations, and the notification that the seating position is the left-side rear seat and the entrance is on the left side of the rear seats.

Then, in step 104, the vehicle equipment control function of the control device 110 serves to determine whether or not the vehicle V has approached a station ST. An affirmative determination is followed by step 105. In step 105, the vehicle equipment control function serves to transmit the control command for operating the display device 510 when opening the door on the left side of the rear seats to the onboard terminal 300 via the communication device 120. For example, the control device 330 of the onboard terminal 300 controls the monitor as the display device 510 to display that the seating position of the user U is the left-side rear seat and the entrance for the user U is on the left side of the rear seats and controls the lighting lamp as the display device 510, which is provided on the door lever of the left-side rear door to be opened, to light up. In addition or alternatively, a speaker may be used to notify by sound or voice that the door to be opened is on the left side of the rear seats.

Then, in step 106, the vehicle equipment control function serves to determine whether or not the vehicle V has made a stop at the station ST. An affirmative determination is followed by step 107. In step 107, the vehicle equipment control function serves to transmit the control command for operating the door opening and closing device 520 when opening the door on the left side of the rear seats to the onboard terminal 300 via the communication device 120. The control device 330 operates the door opening and closing device 520 so that the door on the left side of the rear seats is opened. Before opening and closing the door, it is checked that the door will not hit the surrounding people and obstacles and there are no side grooves, depressions, puddles, etc. on the road surface, such as using camera images or the like, and the door opening and closing is then carried out. The process is thus concluded.

On the other hand, in step 111, the seating position calculation function serves to determine whether or not the seating position of the user U having the first deboarding order out of the users U, who have already boarded the vehicle, is the left-side rear seat. An affirmative determination is followed by step 112 while a negative determination is followed by step 102. In step 112, the seating position calculation function serves to calculate the seating position of the user U who is now boarding as the right-side rear seat and calculate the entrance for the user U on the right side of the rear seats. Then, in step 113, the reservation information acquisition/record/notification function serves to transmit the reservation settlement information, which includes the seating position and the entrance, to the user terminal 200 via the communication device 120. This allows the display device 230 of the user terminal 200 to display the notification of reservation completion, the notification of the boarding and deboarding locations, and the notification that the seating position is the right-side rear seat and the entrance is on the right side of the rear seats.

Then, in step 114, the vehicle equipment control function of the control device 110 serves to determine whether or not the vehicle V has approached a station ST. An affirmative determination is followed by step 115. In step 115, the vehicle equipment control function serves to transmit the control command for operating the display device 510 when opening the door on the right side of the rear seats to the onboard terminal 300 via the communication device 120. For example, the control device 330 of the onboard terminal 300 controls the monitor as the display device 510 to display that the seating position of the user U is the right-side rear seat and the entrance for the user U is on the right side of the rear seats and controls the lighting lamp as the display device 510, which is provided on the door lever of the right-side rear door to be opened, to light up. In addition or alternatively, a speaker may be used to notify by sound or voice that the door to be opened is on the right side of the rear seats.

Then, in step 116, the vehicle equipment control function serves to determine whether or not the vehicle V has made a stop at the station ST. An affirmative determination is followed by step 117. In step 117, the vehicle equipment control function serves to transmit the control command for operating the door opening and closing device 520 when opening the door on the right side of the rear seats to the onboard terminal 300 via the communication device 120. The control device 330 operates the door opening and closing device 520 so that the door on the right side of the rear seats is opened. Before opening and closing the door, it is checked that the door will not hit the surrounding people and obstacles and there are no side grooves, depressions, puddles, etc. on the road surface, such as using camera images or the like, and the door opening and closing is then carried out. The process is thus concluded.

As described above, in the process executed by the ride-sharing management system 1000 according to one or more embodiments, the seating position of the user U who is now boarding and the entrance for sitting on the seating position are set. This allows the user U to be notified of the seating position and the entrance, for example, such as by controlling the display device 230 of the user terminal 200 to display the seating position and the entrance, and it is possible to achieve smooth boarding of the user U to the vehicle V.

Moreover, in one or more embodiments, the entrance to the vehicle V is displayed on the display device 230 of the user terminal 200 and the display device 510 provided in the vehicle V, so that the user U who is now boarding the vehicle V is notified of the entrance. This allows the user U who is now boarding the vehicle 1 to perceive the entrance to the vehicle V and it is therefore possible to achieve smooth boarding of the user U to the vehicle V.

Furthermore, in one or more embodiments, when the vehicle V makes a stop at the boarding location on the travel route, the door opening and closing device 520 is controlled to open the door of the entrance. This can achieve smooth boarding of the user U to the vehicle V. The door may not necessarily have to be opened when the vehicle V makes a stop at the boarding location, and only the door lock may be unlocked.

Figure 11:
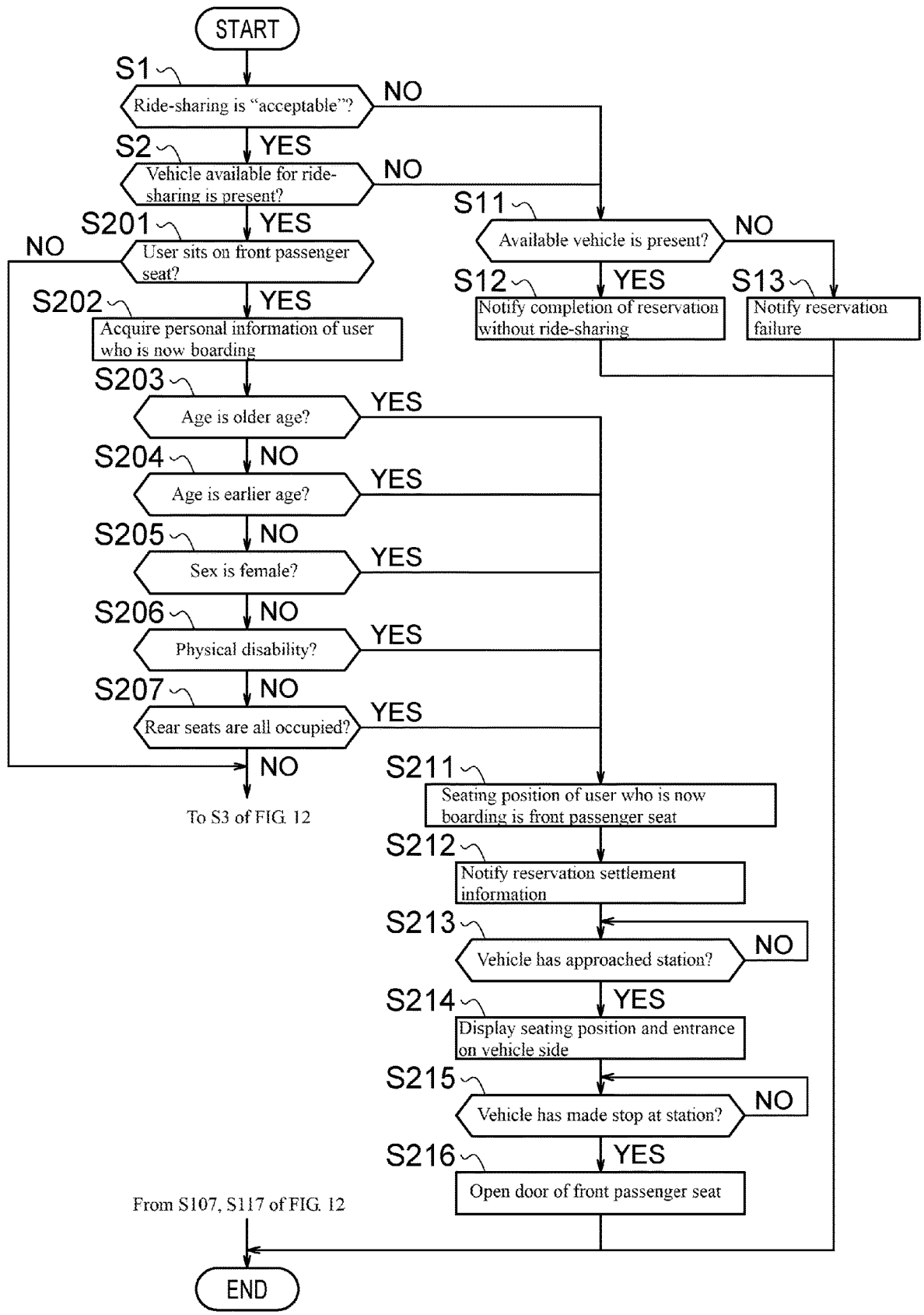
FIG. 11 is a flowchart illustrating one or more embodiments of the process executed by the ride-sharing management system.
Figure 12:
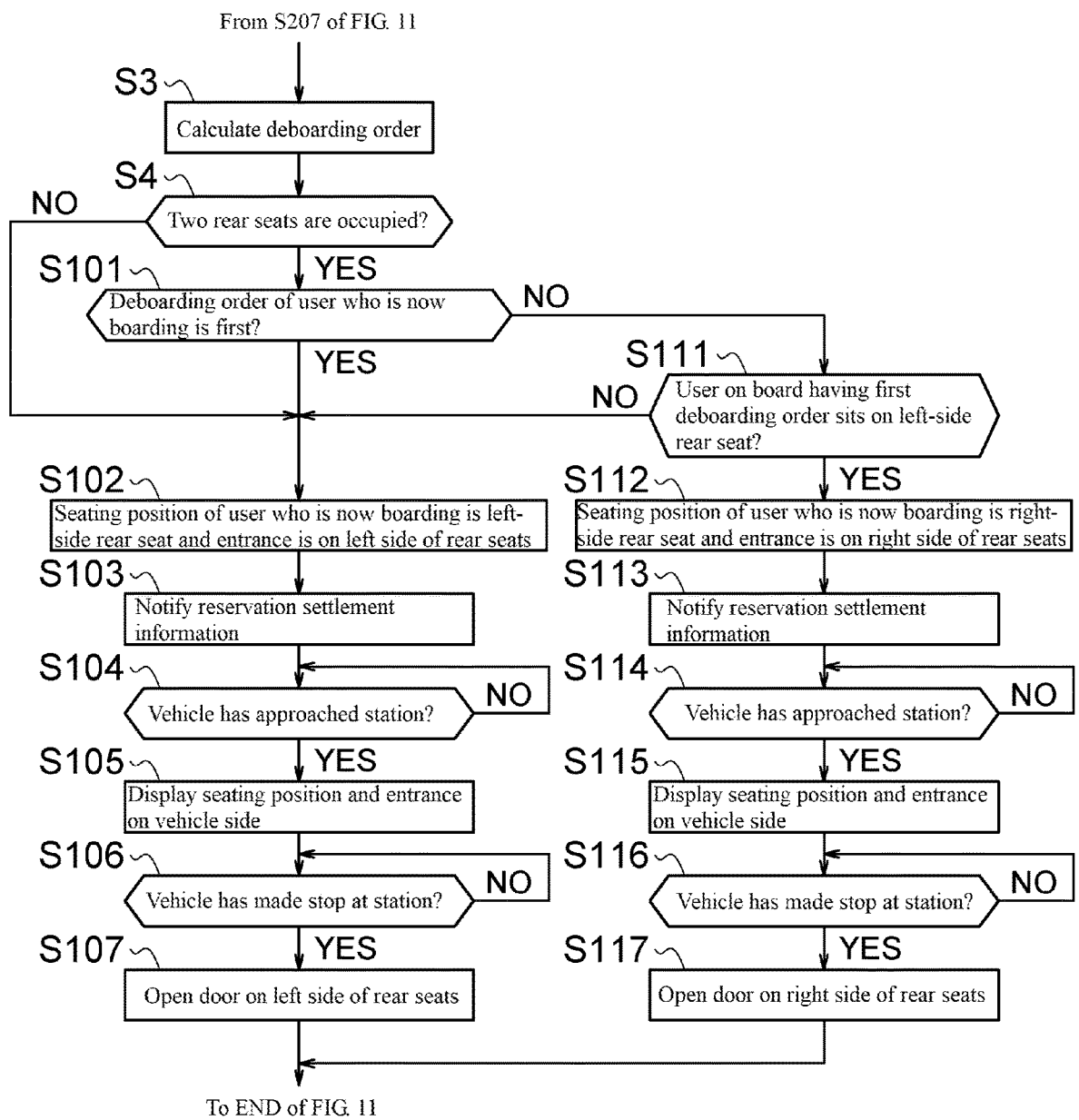
FIG. 12 is a flowchart illustrating one or more embodiments of the process executed by the ride-sharing management system.

FIG. 11 and FIG. 12 are flowcharts illustrating one or more embodiments of the process executed by the ride-sharing management system 1000. The process illustrated in these flowcharts is started when the reservation request information is input from the user terminal 200, and the process proceeds to step 1. Steps 1, 2, and 11 to 13 are the same as those in one or more embodiments, so repetitive description will be omitted and the description given above will be borrowed herein.

When an affirmative determination is made in step 2, the process proceeds to step 201. In step 201, the seating position calculation function serves to determine whether or not a user U sits on the front passenger seat of the vehicle V. A negative determination is followed by step 3 while an affirmative determination is followed by step 202. In step 202, the user management function serves to acquire the personal information of the user U who is now boarding the vehicle.

Then, in step 203, the seating position calculation function serves to determine whether or not the age of the user U who is now boarding is an older age (e.g. 75 years old or older) from the personal information of the user U acquired using the user management function. An affirmative determination is followed by step 211 while a negative determination is followed by step 204. In step 204, the seating position calculation function serves to determine whether or not the age of the user U who is now boarding is an earlier age (e.g. 12 years old or younger) from the personal information of the user U acquired using the user management function. An affirmative determination is followed by step 211 while a negative determination is followed by step 205.

In step 205, the seating position calculation function serves to determine whether or not the sex of the user U who is now boarding is a female from the personal information of the user U acquired using the user management function. An affirmative determination is followed by step 211 while a negative determination is followed by step 206. In step 206, the seating position calculation function serves to determine whether or not the user U who is now boarding has a physical disability from the personal information of the user U acquired using the user management function. An affirmative determination is followed by step 211 while a negative determination is followed by step 207.

In step 207, the seating position calculation function serves to determine whether or not the rear seats are all occupied. An affirmative determination is followed by step 211 while a negative determination is followed by step 3. Thereafter, as in one or more embodiments, steps 3 to 117 illustrated in FIG. 12 are executed. That is, the seating position of the user U who is now boarding is set in accordance with the boarding and deboarding locations and the deboarding order. In addition, the monitor as the display device 510 is controlled to display that the seating position of the user U is the left-side or right-side rear seat and the entrance for the user U is on the left side or right side of the rear seats, and the lighting lamp as the display device 510, which is provided on the door lever of the left-side or right-side rear door to be opened, is controlled to light up. Furthermore, after the vehicle V makes a stop at the station ST, the door on the left side or right side of the rear seats is opened.

In step 211 illustrated in FIG. 11, the seating position calculation function serves to calculate the seating position of the user U who is now boarding as the front passenger seat. Then, in step 212, the reservation information acquisition/record/notification function serves to transmit the reservation settlement information, which includes the seating position and the entrance, to the user terminal 200 via the communication device 120. This allows the display device 230 of the user terminal 200 to display the notification of reservation completion, the notification of the boarding and deboarding locations, and the notification that the seating position is the front passenger seat and the entrance is on the left side of the front seats.

Then, in step 213, the vehicle equipment control function of the control device 110 serves to determine whether or not the vehicle V has approached a station ST. An affirmative determination is followed by step 214. In step 214, the vehicle equipment control function serves to transmit the control command for operating the display device 510 when opening the door of the front passenger seat to the onboard terminal 300 via the communication device 120. For example, the control device 330 of the onboard terminal 300 controls the monitor as the display device 510 to display that the seating position of the user U is the front passenger seat and the entrance for the user U is on the side of the front passenger seat and controls the lighting lamp as the display device 510, which is provided on the door lever of the door of the front passenger seat to be opened, to light up. In addition or alternatively, a speaker may be used to notify by sound or voice that the door to be opened is on the side of the front passenger seat.

Then, in step 215, the vehicle equipment control function serves to determine whether or not the vehicle V has made a stop at the station ST. An affirmative determination is followed by step 216. In step 216, the vehicle equipment control function serves to transmit the control command for operating the door opening and closing device 520 when opening the door of the front passenger seat to the onboard terminal 300 via the communication device 120. The control device 330 operates the door opening and closing device 520 so that the door of the front passenger seat is opened. The process is thus concluded.

As described above, in the process executed by the ride-sharing management system 1000 according to one or more embodiments, the seating position is set in accordance with the attribute of the user U, such as age and sex. Through this operation, as described above, the seating position can be set with consideration for the attribute of the user U, such as by setting the seating position of the user U of an older age, an earlier age, or a female as the front passenger seat, and it is thus possible to achieve smooth boarding and deboarding of the user U.

In one or more embodiments, the seating position is set in accordance with the attribute of the user U, but alternatively or in addition to this, the seating position may be set in accordance with a request from the user U (such as a desire for a seating position at which sunshine can be avoided and a desire for a seating position at which the room temperature is appropriately set) or other appropriate schemes may be employed.

Figure 13:
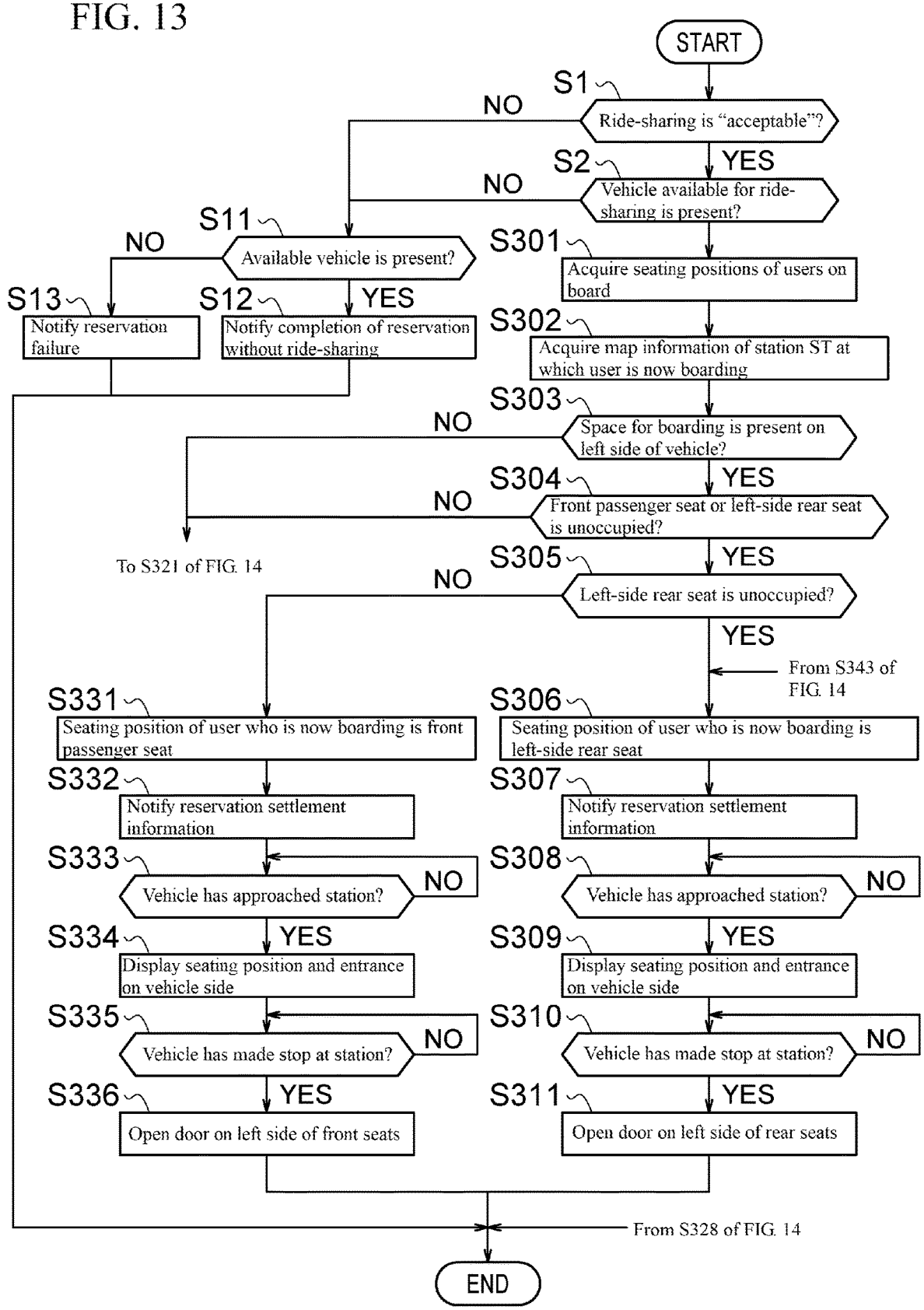
FIG. 13 is a flowchart illustrating one or more embodiments of the process executed by the ride-sharing management system.
Figure 14:
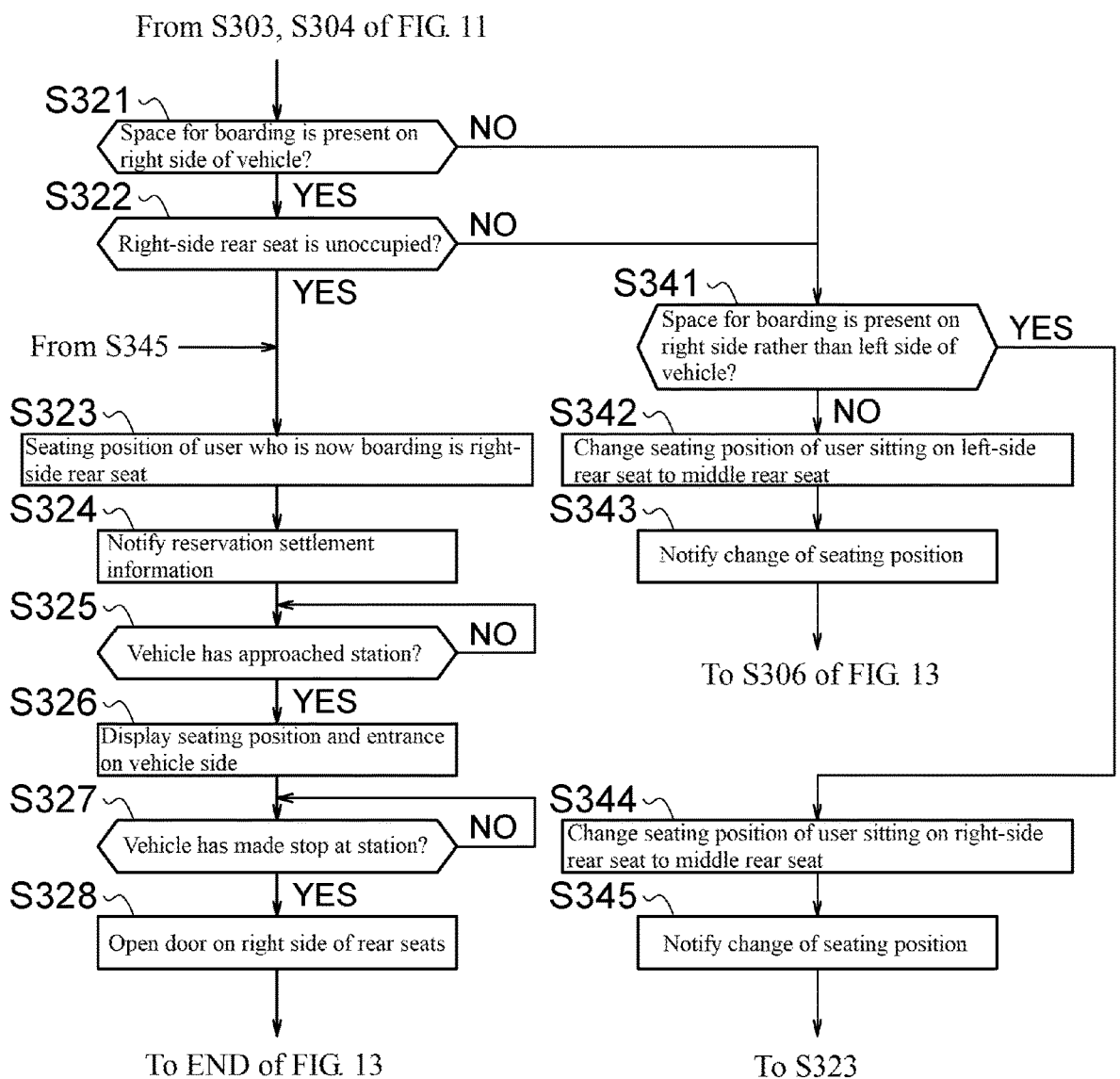
FIG. 14 is a flowchart illustrating one or more embodiments of the process executed by the ride-sharing management system.

FIG. 13 and FIG. 14 are flowcharts illustrating one or more embodiments of the process executed by the ride-sharing management system 1000. The process illustrated in these flowcharts is started when the reservation request information is input from the user terminal 200, and the process proceeds to step 1. Steps 1, 2, and 11 to 13 are the same as those in one or more embodiments above, so repetitive description will be omitted and the description given above will be borrowed herein.

When an affirmative determination is made in step 2, the process proceeds to step 301. In step 301, the seating position calculation function serves to acquire the information on the seating positions of the users U on board from the database 130. Then, in step 302, the seating position calculation function serves to acquire from the database 130 the map information of the station ST at which a user U is now boarding.

Then, in step 303, the seating position calculation function serves to determine whether or not there is a sufficient space for boarding or deboarding on the left side of the vehicle V at the station ST at which the user U is now boarding, on the basis of the boarding location on the travel route of the vehicle V and the map information recorded in the database 130. An affirmative determination is followed by step 304 while a negative determination is followed by step 321 of FIG. 14.

In step 304, the seating position calculation function serves to determine whether or not the left-side rear seat or the front passenger seat (left-side front seat) of the vehicle V is unoccupied by a user U. An affirmative determination is followed by step 305 while a negative determination is followed by step 321. In step 305, the seating position calculation function serves to determine whether or not the left-side rear seat is unoccupied by a user U. An affirmative determination is followed by step 306 while a negative determination is followed by step 331.

In step 306, the seating position calculation function serves to calculate the seating position of the user U who is now boarding as the left-side rear seat. Then, in step 307, the reservation information acquisition/record/notification function serves to transmit the reservation settlement information, which includes the seating position and the entrance, to the user terminal 200 via the communication device 120. This allows the display device 230 of the user terminal 200 to display the notification of reservation completion, the notification of the boarding and deboarding locations, and the notification that the seating position is the left-side rear seat and the entrance is on the left side of the rear seats.

Then, in step 308, the vehicle equipment control function of the control device 110 serves to determine whether or not the vehicle V has approached a station ST. An affirmative determination is followed by step 309. In step 309, the vehicle equipment control function serves to transmit the control command for operating the display device 510 when opening the door on the left side of the rear seats to the onboard terminal 300 via the communication device 120. For example, the control device 330 of the onboard terminal 300 controls the monitor as the display device 510 to display that the seating position of the user U is the left-side rear seat and the entrance for the user U is on the left side of the rear seats and controls the lighting lamp as the display device 510, which is provided on the door lever of the left-side rear door to be opened, to light up. In addition or alternatively, a speaker may be used to notify by sound or voice that the door to be opened is on the left side of the rear seats.

Then, in step 310, the vehicle equipment control function serves to determine whether or not the vehicle V has made a stop at the station ST. An affirmative determination is followed by step 311. In step 311, the vehicle equipment control function serves to transmit the control command for operating the door opening and closing device 520 when opening the door on the left side of the rear seats to the onboard terminal 300 via the communication device 120. The control device 330 operates the door opening and closing device 520 so that the door on the left side of the rear seats is opened. The process is thus concluded.

On the other hand, in step 331, the seating position calculation function serves to calculate the seating position of the user U who is now boarding as the left-side front seat (front passenger seat). Then, in step 332, the reservation information acquisition/record/notification function serves to transmit the reservation settlement information, which includes the seating position and the entrance, to the user terminal 200 via the communication device 120. This allows the display device 230 of the user terminal 200 to display the notification of reservation completion, the notification of the boarding and deboarding locations, and the notification that the seating position is the front passenger seat and the entrance is on the left side of the front seats.

Then, in step 333, the vehicle equipment control function of the control device 110 serves to determine whether or not the vehicle V has approached a station ST. An affirmative determination is followed by step 334. In step 334, the vehicle equipment control function serves to transmit the control command for operating the display device 510 when opening the door on the left side of the front seats to the onboard terminal 300 via the communication device 120. For example, the control device 330 of the onboard terminal 300 controls the monitor as the display device 510 to display that the seating position of the user U is the left-side front seat and the entrance for the user U is on the left side of the front seats and controls the lighting lamp as the display device 510, which is provided on the door lever of the left-side front door to be opened, to light up. In addition or alternatively, a speaker may be used to notify by sound or voice that the door to be opened is on the left side of the front seats.

Then, in step 335, the vehicle equipment control function serves to determine whether or not the vehicle V has made a stop at the station ST. An affirmative determination is followed by step 336. In step 336, the vehicle equipment control function serves to transmit the control command for operating the door opening and closing device 520 when opening the door on the left side of the front seats to the onboard terminal 300 via the communication device 120. The control device 330 operates the door opening and closing device 520 so that the door on the left side of the front seats is opened. The process is thus concluded.

A negative determination in step 303 or 304 is followed by step 321 of FIG. 14, in which the seating position calculation function serves to determine whether or not there is a sufficient space for boarding or deboarding on the right side of the vehicle V at the station ST at which the user U is now boarding, on the basis of the boarding location on the travel route of the vehicle V and the map information recorded in the database 130. An affirmative determination is followed by step 322 while a negative determination is followed by step 341.

In step 322, the seating position calculation function serves to determine whether or not the right-side rear seat is unoccupied by a user U. An affirmative determination is followed by step 323 while a negative determination is followed by step 341. In step 323, the seating position calculation function serves to calculate the seating position of the user U who is now boarding as the right-side rear seat. Then, in step 324, the reservation information acquisition/record/notification function serves to transmit the reservation settlement information, which includes the seating position and the entrance, to the user terminal 200 via the communication device 120. This allows the display device 230 of the user terminal 200 to display the notification of reservation completion, the notification of the boarding and deboarding locations, and the notification that the seating position is the right-side rear seat.

Then, in step 325, the vehicle equipment control function of the control device 110 serves to determine whether or not the vehicle V has approached a station ST. An affirmative determination is followed by step 326. In step 326, the vehicle equipment control function serves to transmit the control command for operating the display device 510 when opening the door on the right side of the rear seats to the onboard terminal 300 via the communication device 120. For example, the control device 330 of the onboard terminal 300 controls the monitor as the display device 510 to display that the seating position of the user U is the right-side rear seat and the entrance for the user U is on the right side of the rear seats and controls the lighting lamp as the display device 510, which is provided on the door lever of the right-side rear door to be opened, to light up. In addition or alternatively, a speaker may be used to notify by sound or voice that the door to be opened is on the right side of the rear seats.

Then, in step 327, the vehicle equipment control function serves to determine whether or not the vehicle V has made a stop at the station ST. An affirmative determination is followed by step 328. In step 328, the vehicle equipment control function serves to transmit the control command for operating the door opening and closing device 520 when opening the door on the right side of the rear seats to the onboard terminal 300 via the communication device 120. The control device 330 operates the door opening and closing device 520 so that the door on the right side of the rear seats is opened. The process is thus concluded.

A negative determination in step 321 is followed by step 341, in which the seating position calculation function serves to determine whether or not there is a sufficient space for boarding or deboarding on the right side rather than the left side of the vehicle V at the station ST at which the user U is now boarding, on the basis of the boarding location on the travel route of the vehicle V and the map information recorded in the database 130. An affirmative determination is followed by step 344 while a negative determination is followed by step 342.

In step 342, the seating position calculation function serves to calculate the seating position of the user U sitting on the left-side rear seat as the middle rear seat. Then, in step 343, the reservation information acquisition/record/notification function serves to transmit the notification information to the user terminal 200 of the user U via the communication device 120 to the effect that the seating position of the user U sitting on the left-side rear seat is changed to the middle rear seat. Then, in step 306 illustrated in FIG. 13, the seating position calculation function serves to calculate the seating position of the user U who is now boarding as the left-side rear seat. Thereafter, the above-described steps 307 to 311 are executed to conclude the process.

On the other hand, in step 344 illustrated in FIG. 14, the seating position calculation function serves to calculate the seating position of the user U sitting on the right-side rear seat as the middle rear seat. Then, in step 345, the reservation information acquisition/record/notification function serves to transmit the notification information to the user terminal 200 of the user U via the communication device 120 to the effect that the seating position of the user U sitting on the right-side rear seat is changed to the middle rear seat. Then, in step 323 illustrated in FIG. 14, the seating position calculation function serves to calculate the seating position of the user U who is now boarding as the right-side rear seat. Thereafter, the above-described steps 324 to 328 are executed to conclude the process.

As described above, in the process executed by the ride-sharing management system 1000 according to one or more embodiments, the seating position of the user U who is now boarding is set in accordance with the easiness of boarding/deboarding in the right and left spaces of the vehicle V. This can achieve smooth boarding of the user U to the vehicle V.

Figure 15:
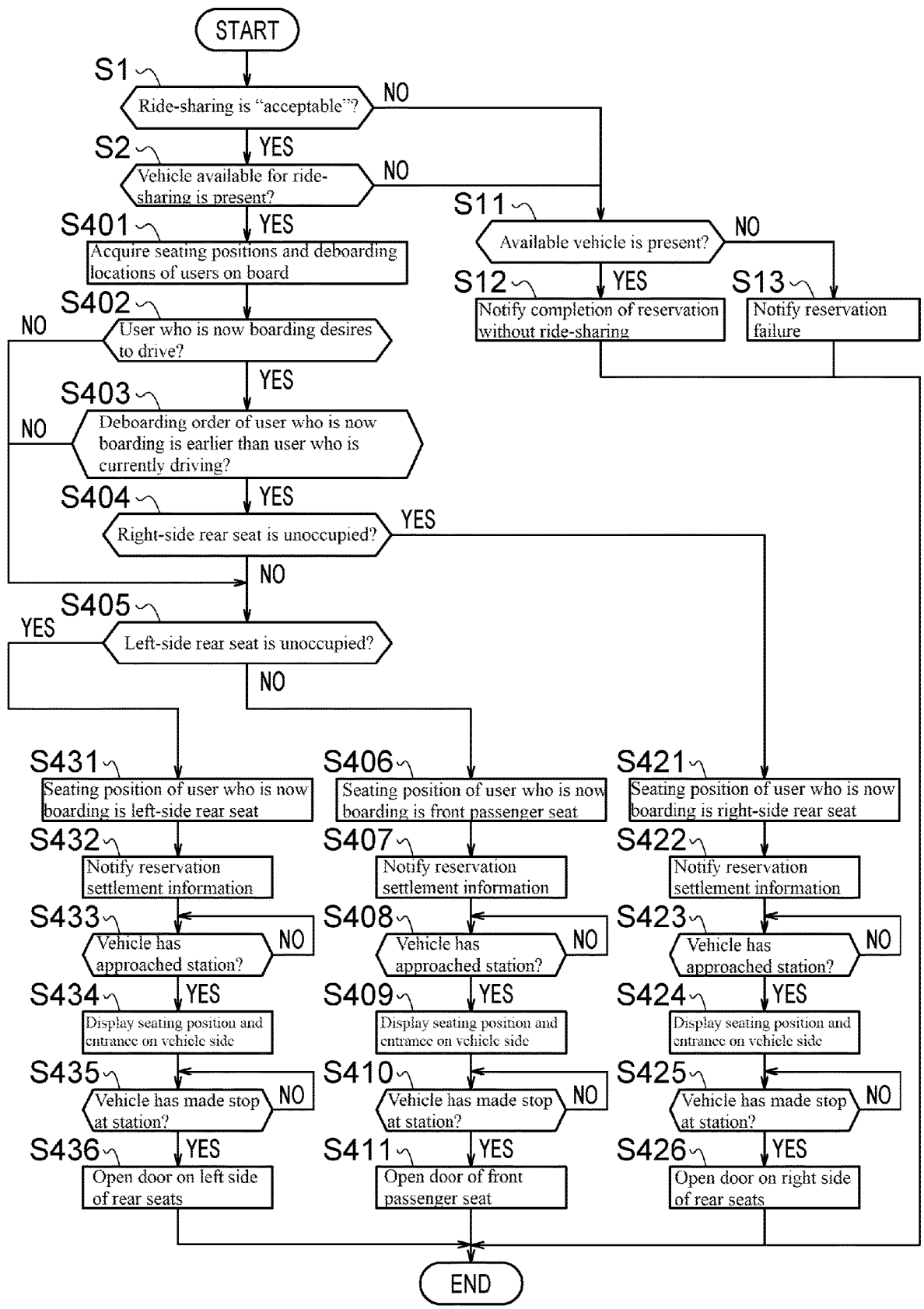
FIG. 15 is a flowchart illustrating one or more embodiments of the process executed by the ride-sharing management system.

FIG. 15 is a flowchart illustrating one or more embodiments of the process executed by the ride-sharing management system 1000. The process illustrated in this flowchart is started when the reservation request information is input from the user terminal 200, and the process proceeds to step 1. Steps 1, 2, and 11 to 13 are the same as those in one or more embodiments, so repetitive description will be omitted and the description given above will be borrowed herein.

When an affirmative determination is made in step 2, the process proceeds to step 401. In step 401, the seating position calculation function serves to acquire the information on the seating positions and deboarding locations of the users U on board from the database 130. Then, in step 402, the seating position calculation function serves to determine whether or not the user U who is now boarding desires to drive, from the reservation request information. An affirmative determination is followed by step 403 while a negative determination is followed by step 405.

In step 403, the seating position calculation function serves to determine whether or not the deboarding order of the user U who is now boarding is earlier than the deboarding order of the user U who is driving at the moment, from the deboarding location of the user U who is now boarding and the deboarding location of the user U who is driving at the moment. The latter deboarding location is stored in the database 130. An affirmative determination is followed by step 404 while a negative determination is followed by step 405.

In step 404, the seating position determination function serves to determine whether or not the right-side rear seat is unoccupied by a user U on board, from the information on the boarding location of the user U stored in the database 130. A negative determination is followed by step 405 while an affirmative determination is followed by step 421.

In step 405, the seating position determination function serves to determine whether or not the left-side rear seat is unoccupied by a user U on board, from the information on the boarding location of the user U stored in the database 130. A negative determination is followed by step 406 while an affirmative determination is followed by step 431.

In step 406, the seating position determination function serves to calculate the seating position of the user U who is now boarding as the front passenger seat. Then, in step 407, the reservation information acquisition/record/notification function serves to transmit the reservation settlement information, which includes the seating position and the entrance, to the user terminal 200 via the communication device 120. This allows the display device 230 of the user terminal 200 to display the notification of reservation completion, the notification of the boarding and deboarding locations, and the notification that the seating position is the front passenger seat and the entrance is on the left side of the front seats.

Then, in step 408, the vehicle equipment control function of the control device 110 serves to determine whether or not the vehicle V has approached a station ST. An affirmative determination is followed by step 409. In step 409, the vehicle equipment control function serves to transmit the control command for operating the display device 510 when opening the door on the left side of the front seats to the onboard terminal 300 via the communication device 120. For example, the control device 330 of the onboard terminal 300 controls the monitor as the display device 510 to display that the seating position of the user U is the front passenger seat and the entrance for the user U is on the left side of the front seats and controls the lighting lamp as the display device 510, which is provided on the door lever of the left-side front door to be opened, to light up. In addition or alternatively, a speaker may be used to notify by sound or voice that the door to be opened is on the left side of the front seats.

Then, in step 410, the vehicle equipment control function serves to determine whether or not the vehicle V has made a stop at the station ST. An affirmative determination is followed by step 411. In step 411, the vehicle equipment control function serves to transmit the control command for operating the door opening and closing device 520 when opening the door on the left side of the front seats to the onboard terminal 300 via the communication device 120. The control device 330 operates the door opening and closing device 520 so that the door on the left side of the front seats is opened. The process is thus concluded.

On the other hand, in step 421, the seating position determination function serves to calculate the seating position of the user U who is now boarding as the right-side rear seat. Then, in step 422, the reservation information acquisition/record/notification function serves to transmit the reservation settlement information, which includes the seating position and the entrance, to the user terminal 200 via the communication device 120. This allows the display device 230 of the user terminal 200 to display the notification of reservation completion, the notification of the boarding and deboarding locations, and the notification that the seating position is the right-side rear seat and the entrance is on the right side of the rear seats.

Then, in step 423, the vehicle equipment control function of the control device 110 serves to determine whether or not the vehicle V has approached a station ST. An affirmative determination is followed by step 424. In step 424, the vehicle equipment control function serves to transmit the control command for operating the display device 510 when opening the door on the right side of the rear seats to the onboard terminal 300 via the communication device 120. For example, the control device 330 of the onboard terminal 300 controls the monitor as the display device 510 to display that the seating position of the user U is the right-side rear seat and the entrance for the user U is on the right side of the rear seats and controls the lighting lamp as the display device 510, which is provided on the door lever of the right-side rear door to be opened, to light up. In addition or alternatively, a speaker may be used to notify by sound or voice that the door to be opened is on the right side of the rear seats.

Then, in step 425, the vehicle equipment control function serves to determine whether or not the vehicle V has made a stop at the station ST. An affirmative determination is followed by step 426. In step 426, the vehicle equipment control function serves to transmit the control command for operating the door opening and closing device 520 when opening the door on the right side of the rear seats to the onboard terminal 300 via the communication device 120. The control device 330 operates the door opening and closing device 520 so that the door on the right side of the rear seats is opened. The process is thus concluded.

An affirmative determination in step 405 is followed by step 431, in which the seating position determination function serves to calculate the seating position of the user U who is now boarding as the left-side rear seat. Then, in step 432, the reservation information acquisition/record/notification function serves to transmit the reservation settlement information, which includes the seating position and the entrance, to the user terminal 200 via the communication device 120. This allows the display device 230 of the user terminal 200 to display the notification of reservation completion, the notification of the boarding and deboarding locations, and the notification that the seating position is the left-side rear seat and the entrance is on the left side of the rear seats.

Then, in step 433, the vehicle equipment control function of the control device 110 serves to determine whether or not the vehicle V has approached a station ST. An affirmative determination is followed by step 434. In step 434, the vehicle equipment control function serves to transmit the control command for operating the display device 510 when opening the door on the left side of the rear seats to the onboard terminal 300 via the communication device 120. For example, the control device 330 of the onboard terminal 300 controls the monitor as the display device 510 to display that the seating position of the user U is the left-side rear seat and the entrance for the user U is on the left side of the rear seats and controls the lighting lamp as the display device 510, which is provided on the door lever of the left-side rear door to be opened, to light up. In addition or alternatively, a speaker may be used to notify by sound or voice that the door to be opened is on the left side of the rear seats.

Then, in step 435, the vehicle equipment control function serves to determine whether or not the vehicle V has made a stop at the station ST. An affirmative determination is followed by step 436. In step 436, the vehicle equipment control function serves to transmit the control command for operating the door opening and closing device 520 when opening the door on the left side of the rear seats to the onboard terminal 300 via the communication device 120. The control device 330 operates the door opening and closing device 520 so that the door on the left side of the rear seats is opened. The process is thus concluded.

As described above, in the process executed by the ride-sharing management system 1000 according to one or more embodiments, the seating positions of a plurality of users U are set in accordance with the presence or absence of a desire to drive of the user U who is now boarding. For example, when the user U desires to drive, as described above, the seating position of the user U is set to the seat behind the driver seat (the right-side rear seat). This can achieve smooth movement of the user U from the seat other than the driver seat to the driver seat at the station ST at which the drivers are changed.

Embodiments of the present invention have heretofore been described, but these embodiments are described to facilitate understanding of the present invention and are not described to limit the present invention. It is therefore intended that the elements disclosed in the above embodiments include all design changes and equivalents to fall within the technical scope of the present invention.

For example, the reservation settlement information displayed on the display device 230 of the user terminal 200 may not necessarily include the seating position, and the seating position may only be displayed on the display device 510 of the vehicle V. Moreover, the number of the rear seats is not limited to three and may also be four or more.

DESCRIPTION OF REFERENCE NUMERALS

1000 Ride-sharing management system
  100 Management server
    110 Control device
  200 User terminal
    230 Display device
  300 Onboard terminal
  V Vehicle
  510 Display device
  520 Door opening and closing device

The invention claimed is:

1. A ride-sharing management method for managing ride-sharing of a vehicle by a plurality of users, the ride-sharing management method comprising:
  acquiring, by a management server, information including departure place and destination from user terminals carried by the plurality of users,
  calculating, by the management server, boarding locations of the plurality of users on a travel route of the vehicle for the plurality of users to share a ride on a basis of the departure place,
  calculating, by the management server, deboarding locations of the plurality of users on the travel route on a basis of the destination,
  calculating, by the management server, a deboarding order of the plurality of users on a basis of the boarding locations and the deboarding locations;
  calculating, by the management server, a doorway for an entrance to the vehicle on a basis of the deboarding order of the plurality of users;
  setting, by the management server and based on the deboarding order, a seating position of a user among the plurality of users to a left end or a right end of a seat in the vehicle, wherein the user is first in the deboarding order; and
  automatically operating, by a control device in the vehicle, the doorway for the entrance based on the seating position of the user in the deboarding order, wherein the control device transmits an opening control command to a door opening and closing device connected to the doorway based on the seating position in response to obtaining the deboarding order from the management server.

2. The ride-sharing management method according to claim 1, wherein seating positions of the plurality of users are set in accordance with easiness of boarding/deboarding in right and left spaces of the vehicle at the boarding locations.

3. The ridesharing management method according to claim 1, wherein when the entrance to the vehicle is calculated on the basis of the deboarding order of the plurality of users, the entrance is calculated such that each user can deboard without moving from the seating position.

4. The ride-sharing management method according to claim 1, comprising: determining presence or absence of desires of the plurality of users to drive; and setting the seating position of a user who desires to drive at a front passenger seat.

5. The ride-sharing management method according to claim 1, wherein a user who is boarding the vehicle at one of the boarding locations is notified of the seating position by a notification device provided in at least one of the vehicle and a terminal carried by the user.

6. The ride-sharing management method according to claim 1, wherein an exit from the vehicle is calculated on the basis of the deboarding order of the plurality of users.

7. The ride-sharing management method according to claim 6, wherein a user who is boarding the vehicle at one of the boarding locations is notified of the entrance by a notification device provided in at least one of the vehicle and a terminal carried by the user.

8. The ride-sharing management method according to claim 6, wherein when the vehicle makes a stop at one of the boarding locations, at least one of unlocking and opening of a door of the entrance is executed.

9. The ride-sharing management method according to claim 7, wherein when the vehicle makes a stop at one of the boarding locations, at least one of unlocking and opening of a door of the entrance is executed.

10. The ride-sharing management method according to claim 2, wherein when the entrance to the vehicle is calculated on the basis of the deboarding order of the plurality of users, the entrance is calculated such that each user can deboard without moving from the seating position.

11. The ride-sharing management method according to claim 9, wherein when the entrance to the vehicle is calculated on the basis of the deboarding order of the plurality of users, the entrance is calculated such that each user can deboard without moving from the seating position.

12. The ride-sharing management method according to claim 1 comprising: determining presence or absence of desires of the plurality of users to drive; and setting the seating position of a user who desires to drive at a front passenger seat.

13. The ride-sharing management method according to claim 2, comprising: determining presence or absence of desires of the plurality of users to drive; and setting the seating position of a user who desires to drive at a front passenger seat.

14. The ride-sharing management method according to claim 3, comprising: determining presence or absence of desires of the plurality of users to drive; and setting the seating position of a user who desires to drive at a front passenger seat.

15. The ride-sharing management method according to claim 9, comprising: determining presence or absence of desires of the plurality of users to drive; and setting the seating position of a user who desires to drive at a front passenger seat.

16. A ride-sharing management device comprising a control device configured to manage ride-sharing of a vehicle by a plurality of users, the control device being further configured to:
acquire, using a management server, information including departure place and destination from user terminals carried by the plurality of users;
calculate boarding locations of the plurality of users on a travel route of the vehicle for the plurality of users to share a ride on a basis of the departure place;
calculate deboarding locations of the plurality of users on the travel route on a basis of the destination;
calculate a deboarding order of the plurality of users on a basis of the boarding locations and the deboarding locations;
calculate a doorway for an entrance to the vehicle on a basis of the deboarding order of the plurality of users;
set, based on the deboarding order, a seating position of a user among the plurality of users to a left end or a right end of a seat in the vehicle, wherein the user is first in the deboarding order; and
wherein the control device automatically operates the doorway for the entrance based on the seating position of the user in the deboarding order by transmitting an opening control command to a door opening and closing device connected to the doorway,
wherein the opening control command is transmitted in response to determining the deboarding order using the information from the management server.

17. A vehicle used for a ride-sharing management device, the ride-sharing management device comprising a control device configured to manage ride-sharing of the vehicle by a plurality of users, the control device being further configured to:
acquire, from a management server, information including departure place and destination from user terminals carried by the plurality of users;
calculate boarding locations of the plurality of users on a travel route of the vehicle for the plurality of users to share a ride on a basis of the departure place;
calculate deboarding locations of the plurality of users on the travel route on a basis of the destination;
calculate a deboarding order of the plurality of users on a basis of the boarding locations and the deboarding locations;
calculate a doorway for an entrance to the vehicle on a basis of the deboarding order of the plurality of users; and
set, based on the deboarding order, a seating position of a user among the plurality of users to a left end or a right end of a seat in the vehicle, wherein the user is first in the deboarding order, and
wherein the control device automatically operates the doorway for the entrance based on the seating position of the user in the deboarding order by transmitting an opening control command in response to determining the deboarding order using the information from the management server, and
wherein the vehicle comprises:
the doorway to the entrance;
a notification device configured to give notice at the entrance for sitting on the seating position set by the control device; and
a door opening and closing device connected to the doorway, the door opening and closing device being configured to, when making a stop at the boarding location, execute at least one of unlocking and opening of the doorway of the entrance in response to the opening control command from the control device.

\* \* \* \* \*